US012808217B2

(12) United States Patent
Lipniarski et al.

(10) Patent No.: US 12,808,217 B2
(45) Date of Patent: Nov. 24, 2026

(54) MODULAR LADDER WITH A TAMBOUR BARRIER

(71) Applicant: Confer Plastics, Inc., North Tonawanda, NY (US)

(72) Inventors: David Lipniarski, North Tonawanda, NY (US); John Gawrys, North Tonawanda, NY (US)

(73) Assignee: Confer Plastics, Inc., North Tonawanda, NY (US)

( * ) Notice: Subject to any disclaimer, the term of this patent is extended or adjusted under 35 U.S.C. 154(b) by 0 days.

(21) Appl. No.: 19/538,477

(22) Filed: Feb. 12, 2026

(65) Prior Publication Data

US 2026/0168326 A1 Jun. 18, 2026

Related U.S. Application Data

(63) Continuation of application No. 19/172,116, filed on Apr. 7, 2025.

(Continued)

(51) Int. Cl.
*E04H 4/14* (2006.01)
*E06C 1/39* (2006.01)

(Continued)

(52) U.S. Cl.
CPC ............... *E04H 4/144* (2013.01); *E06C 1/39* (2013.01); *E06C 7/08* (2013.01); *E06C 7/182* (2013.01); *E06C 7/006* (2013.01); *E06C 7/183* (2013.01)

(58) Field of Classification Search
CPC ... E04H 4/144; E06C 1/14; E06C 1/39; E06C 7/181; E06C 7/182; E04G 5/08
See application file for complete search history.

(56) References Cited

U.S. PATENT DOCUMENTS 1,836,163 A * 12/1931 Goode ...................... E06C 1/39 182/222
2,173,900 A 9/1939 Dunn
(Continued)

FOREIGN PATENT DOCUMENTS

CN 205348868 U 6/2016
GB 2230813 A1 10/1990
(Continued)

OTHER PUBLICATIONS

Lipniarski, David J., "A-Frame Ladder With a Flexible Gate/Barrier", U.S. Appl. No. 18/205,909, filed Jun. 5, 2023.
(Continued)

*Primary Examiner* — Colleen M Chavchavadze
(74) *Attorney, Agent, or Firm* — Katherine H. McGuire, Esq.; Woods Oviatt Gilman LLP

(57) ABSTRACT

A user-adjustable, blow-molded ladder or a blow-molded staircase system for ingress and egress of an above-ground swimming pool is provided. In one embodiment, the ladder includes a first side rail structure and a second side rail structure oriented opposite and substantially parallel to the first side rail structure, a platform and a plurality of steps coupling the first side rail to the second side rail, and a flexible tambour barrier configured, in a first position, to inhibit access to the steps from the anterior direction and configured, in a second position, to allow access to the steps from an anterior direction and inhibit pass through entry between the steps.

15 Claims, 18 Drawing Sheets

Related U.S. Application Data

(60) Provisional application No. 63/575,309, filed on Apr. 5, 2024.

(51) Int. Cl.

*E06C 7/08* (2006.01)
*E06C 7/18* (2006.01)
*E06C 7/00* (2006.01)

(56) References Cited

U.S. PATENT DOCUMENTS

| | | | | |
|---|---|---|---|---|
| 2,880,829 | A | 4/1959 | Watkins | |
| 3,106,986 | A | 10/1963 | Ray | |
| 3,225,863 | A | 12/1965 | Ludlow | |
| 3,372,772 | A | 3/1968 | Murray | |
| 3,968,857 | A | 7/1976 | Bryan | |
| 4,023,647 | A | 5/1977 | Confer | |
| 4,067,614 | A | 1/1978 | Confer et al. | |
| 4,126,206 | A | 11/1978 | Becnel | |
| 4,166,833 | A | 9/1979 | Schurman | |
| 4,181,195 | A | 1/1980 | Clarke | |
| 4,524,848 | A | 6/1985 | Russo | |
| 4,579,197 | A | 4/1986 | Spurling | |
| 5,046,582 | A | 9/1991 | Albrecht | |
| 5,366,051 | A | 11/1994 | Bartnicki et al. | |
| 5,441,126 | A | 8/1995 | Orrick | |
| 5,575,353 | A | 11/1996 | Cafaro | |
| 6,102,156 | A | 8/2000 | Lipniarski | |
| 6,755,281 | B2 * | 6/2004 | Saputo | E06C 7/081 182/228.4 |
| 6,769,513 | B2 * | 8/2004 | Pettit | E06C 7/081 182/115 |
| 6,880,674 | B1 | 4/2005 | St-Hilaire | |
| D525,369 | S | 7/2006 | Houze | |
| 7,137,478 | B2 | 11/2006 | Becker | |
| 7,537,069 | B2 | 5/2009 | Kramer et al. | |
| 7,793,759 | B1 | 9/2010 | Aiken, Jr. | |
| 8,191,681 | B2 | 6/2012 | Lipniarski | |
| 8,191,682 | B2 | 6/2012 | Lipniarski | |
| 9,074,384 | B2 * | 7/2015 | Lin | E04H 4/144 |
| 10,920,492 | B2 * | 2/2021 | Shattuck | E06C 1/24 |
| 2003/0079941 | A1 | 5/2003 | Pettit | |
| 2003/0132059 | A1 | 7/2003 | Saputo et al. | |
| 2006/0076188 | A1 | 4/2006 | Horton | |
| 2010/0044153 | A1 | 2/2010 | Lipniarski | |

FOREIGN PATENT DOCUMENTS

| | | | |
|---|---|---|---|
| KR | 10-2020-0112125 | A | 10/2020 |
| WO | 9924687 | A1 | 5/1999 |
| WO | WO2007004022 | A2 | 1/2007 |

OTHER PUBLICATIONS

Lipniarski, David J., "A-Frame Ladder With a Tambour Gate/Barrier", U.S. Appl. No. 18/205,917, filed Jun. 5, 2023.

* cited by examiner

MODULAR LADDER WITH A TAMBOUR BARRIER

CROSS-REFERENCE TO RELATED APPLICATIONS

This application claims priority to U.S. patent application Ser. No. 19/172,116 entitled "Modular Ladder with a Tambour Barrier" filed on Apr. 7, 2025, and claims the benefit of U.S. Provisional Patent Application No. 63/575,309 entitled "Modular Ladder with a Tambour Barrier," both of which are incorporated herein by reference in their entireties.

FIELD OF THE INVENTION

The present invention generally relates to an ingress and/or egress system for use with an above-ground swimming pool.

BACKGROUND OF THE INVENTION

Embodiments of the present invention relate to an above-ground pool ingress and/or egress system and, more specifically, to a user-adjustable, preferably blow-molded ladder or a blow-molded staircase system for ingress and egress of an above-ground swimming pool.

Above-ground swimming pools are known. The most common types of above-ground pools are constructed of steel, resin, plastic, or other materials. Above-ground pools are generally constructed using a perimeter frame, of various designs, with a heavy plastic, vinyl, or fabric liner to contain water. Above-ground pools may also be collapsible to enable convenient storage and/or include portals.

Above-ground pools are generally constructed on a suitably level site, assembled and filled in place. This results in a problem specific to above-ground pools-access. In-ground pools are easily accessible because they are, by definition, at the level of the ground around them. One merely steps from the pool deck into the in-ground pool, though steps or a ladder are often provided. Therefore, with an in-ground pool a user simply lowers themselves into the water.

In contrast, to access an above-ground pool, a ladder, deck, or other apparatus must be provided requiring a user to first climb up to the lip or rim of the pool and then down to enter the water. Additionally, the frame provided with an above-ground pool is often designed to provide a shape to a liner and provide structural support. The frame may lack the structural rigidity for use in entering or exiting the pool.

Accordingly, most above-ground pools include a deck or ladder to aid ingress and egress. Because the sides of an above-ground pool are generally not sufficiently rigid to support the ladder, the ladder must either be supported by the pool deck, which is self-supporting, or the ladder must be a self-supporting A-frame type ladder. In both instances, a portion of these ladders rests on the bottom of the pool, creating an area between the pool wall and the ladder in which a swimmer's body and/or limbs can become trapped.

In addition, the ladder in an above-ground pool also tends to angle away from the sidewall of the pool from top to bottom creating a roughly triangular area formed by the ladder, the sidewall, and the bottom of the pool in which one can become trapped or entangled. Further, because the ladder and the ladder rungs are farther away from the sidewall of the pool, the chances increase that a swimmer's foot will slip off of the ladder rung and become entangled in the ladder, or between the ladder and the pool.

SUMMARY OF THE INVENTION

Aspects of the disclosure are to address at least the above-mentioned problems and/or disadvantages, and to provide at least the advantages described below. Embodiments of the present disclosure are directed to a ladder assembly including first and second side rail structures each having an upper end and first and second, oppositely facing surfaces. The first surface of the first side rail structure and the second surface of the second side rail structure face each other in an assembled condition of the ladder assembly. The ladder assembly also includes at least one stair member spanning between the first and second side rail structures in the assembled condition of the ladder assembly and a platform having an upper surface, a lower surface opposite the upper surface, and an outer perimeter defining a posterior edge, an anterior edge, and side surfaces. The platform has first and second openings passing through the upper surface to the lower surface. The ladder assembly also includes first and second handrails each having a posterior member with at least one anterior locking lug extending from the posterior member. In the assembled condition the upper end of the first side rail structure occupies a portion of the platform first opening, the anterior locking lug of the first handrail occupies a portion of the platform first opening and interlocks with the upper end of the first side rail structure within the platform first opening. In the assembled condition the upper end of the second side rail structure occupies a portion of the platform second opening, the anterior locking lug of the second handrail occupies a portion of the platform second opening and interlocks with the upper end of the second side rail structure within the platform second opening. The first and second side rail structure are interchangeable for purposes of interconnecting with the first and second handrail in the platform first and second openings, respectively.

Further embodiments of the present disclosure are directed to a ladder for entering or exiting an above-ground swimming pool. The ladder includes first and second side rail structures each having an upper end and a platform supported by the first and second side rail structures. The platform has an upper surface, a lower surface opposite the upper surface, and an outer perimeter defining a posterior edge, an anterior edge, and side edges, the platform having first and second openings passing through the upper surface to the lower surface. The first and second handrails each have a posterior member with at least one anterior locking lug extending from the posterior member. The upper end of the first and second side rail structures each include recesses oriented along a first axis and a first channel oriented along a second axis different from the first axis, the second axis being generally parallel with the upper surface of the platform. The anterior locking lugs of the first and second handrails interlock with the upper end of the first and second side rail structures, respectively, in the recesses. The first handrail interlocks with the first side rail structure by sliding the first handrail relative to the first side rail structure along the second axis. The second handrail interlocks with the second side rail structure by sliding the second handrail relative to the second side rail structure along the second axis. The first and second handrails form an interference fit with the first and second side rail structures, respectively.

Further embodiments of the present disclosure are directed to a modular ladder for entering and exiting a swimming pool. The modular ladder includes a first ladder and a second ladder, each ladder having two siderail structures, each with apertures therein, and a plurality of steps secured to the siderail structures in the apertures. Each of the ladders has an anterior side from which the steps are accessible, and a posterior side opposite the anterior side. The modular ladder also includes a platform configured to secure to the ladders to provide a platform surface at a top of the ladders, handrails securable to at least one of the ladders or the platform or to both the ladders and the platform, and a mounting assembly configured to secure to at least one of the handrails or to the platform. The modular ladder is operable in least three different configurations. A first configuration is an A-frame configuration in which the first ladder is positioned with the posterior side near an outside wall of the swimming pool, and the second ladder is positioned inside of the swimming pool with the ladder extending into water in the swimming pool, the handrails are secured to the first ladder and to the second ladder, the handrails secured to the first ladder are also secured to the handrails secured to the second ladder, the platform is secured to at least one of the first ladder or the second ladder. In the A-frame configuration the mounting assembly is unused. A second configuration is a ladder-in configuration in which the first ladder is positioned inside of the swimming pool with the ladder extending into the water in the swimming pool, the handrails are secured to the first ladder, the mounting assembly is secured to the handrails, and the mounting assembly includes a mounting foot that rests on a deck at or near a level of the platform. In some embodiments the mounting assembly can be fastened to an inside feature of the pool. In the ladder-in configuration the second ladder is unused. A third configuration is a ladder-out configuration in which the first ladder is positioned outside of the swimming pool with the posterior side near an outside wall of the swimming pool, the handrails are secured to the first ladder, the platform is secured to the first ladder. In the ladder-out configuration the second ladder is unused.

Further embodiments of the present disclosure are directed to a ladder assembly configurable from an unassembled condition to an assembled condition. The ladder assembly includes substantially identical first and second side rails each having an upper end and first and second, oppositely facing surfaces, wherein the first surface of the first side railing and the second surface of the second side railing face each other in the assembled condition of the ladder. The ladder assembly also includes at least one stair member having first and second opposite ends configured to attach to the first surface of the first side railing and the second surface of the second side railing, respectively, in the assembled condition of the ladder assembly. The ladder assembly also includes a platform having opposite upper and lower surfaces surrounded by an outer perimeter having first and second opposite side edges, the platform having a first pair of openings located adjacent the first and second side edges, respectively, the first pair of openings extending completely through the platform from the lower to the upper surface thereof. The ladder assembly also includes first and second handrails each having a posterior member with at least one anterior locking lug extending from the posterior member. During assembly of the ladder the upper end of each of the first and second side rails is configured to extend into and locate within a respective one of the platform first pair of openings with the first and second side rails extending downwardly from the platform bottom surface. During assembly of the ladder, the anterior locking lug of each of the first and second handrails is configured to extend into and locate within a respective one of the platform first pair of openings with the first and second handrails extending upwardly from the platform upper surface. The upper end of each of the first and second side rails and a respective anterior locking lug of each of the first and second handrailing are cooperatively configured to interlock with each other in a respective one of the platform first pair of openings and thereby locking the platform in place therebetween with the ladder in the assembled condition.

Further embodiments of the present disclosure are directed to an A-frame ladder assembly configurable from an unassembled condition to an assembled condition. The A-frame ladder assembly includes first and second substantially identical single ladder assemblies. Each of the first and second ladder assembly includes substantially identical first and second side rails each having an upper end and first and second, oppositely facing surfaces, wherein the first surface of the first side railing and the second surface of the second side railing face each other in the assembled condition of the ladder, and at least one stair member having first and second opposite ends configured to attach to the first surface of the first side railing and the second surface of the second side railing, respectively, in the assembled condition of the ladder assembly. The ladder assemblies each also include a platform having opposite upper and lower surfaces surrounded by an outer perimeter having first and second opposite side edges, the platform having a first pair of openings located adjacent the first and second side edges, respectively, the first pair of openings extending completely through the platform from the lower surface to the upper surface thereof. The ladder assembly also includes first and second handrails each having a posterior member with at least one anterior locking lug extending from the posterior member. During assembly of the ladder, the upper end of each of the first and second side rails is configured to extend into and locate within a respective one of the platform first pair of openings with the first and second side rails extending downwardly from the platform bottom surface. During assembly of the ladder the anterior locking lug of each of the first and second handrails is configured to extend into and locate within a respective one of the platform first pair of openings with the first and second handrails extending upwardly from the platform upper surface. The upper end of each of the first and second side rails and a respective anterior locking lug of each of the first and second handrailing are cooperatively configured to interlock with each other in a respective one of the platform first pair of openings and thereby locking the platform in place therebetween with the ladder in the assembled condition. Each of the hand railings on the first and second ladder assemblies include a coupling flange which are connectable with each other to form the A-frame ladder assembly.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWING

The above-mentioned and other features and advantages of this invention, and the manner of attaining them, will become apparent and be better understood by reference to the following description of the invention in conjunction with accompanying drawing, wherein.

Figure 1:
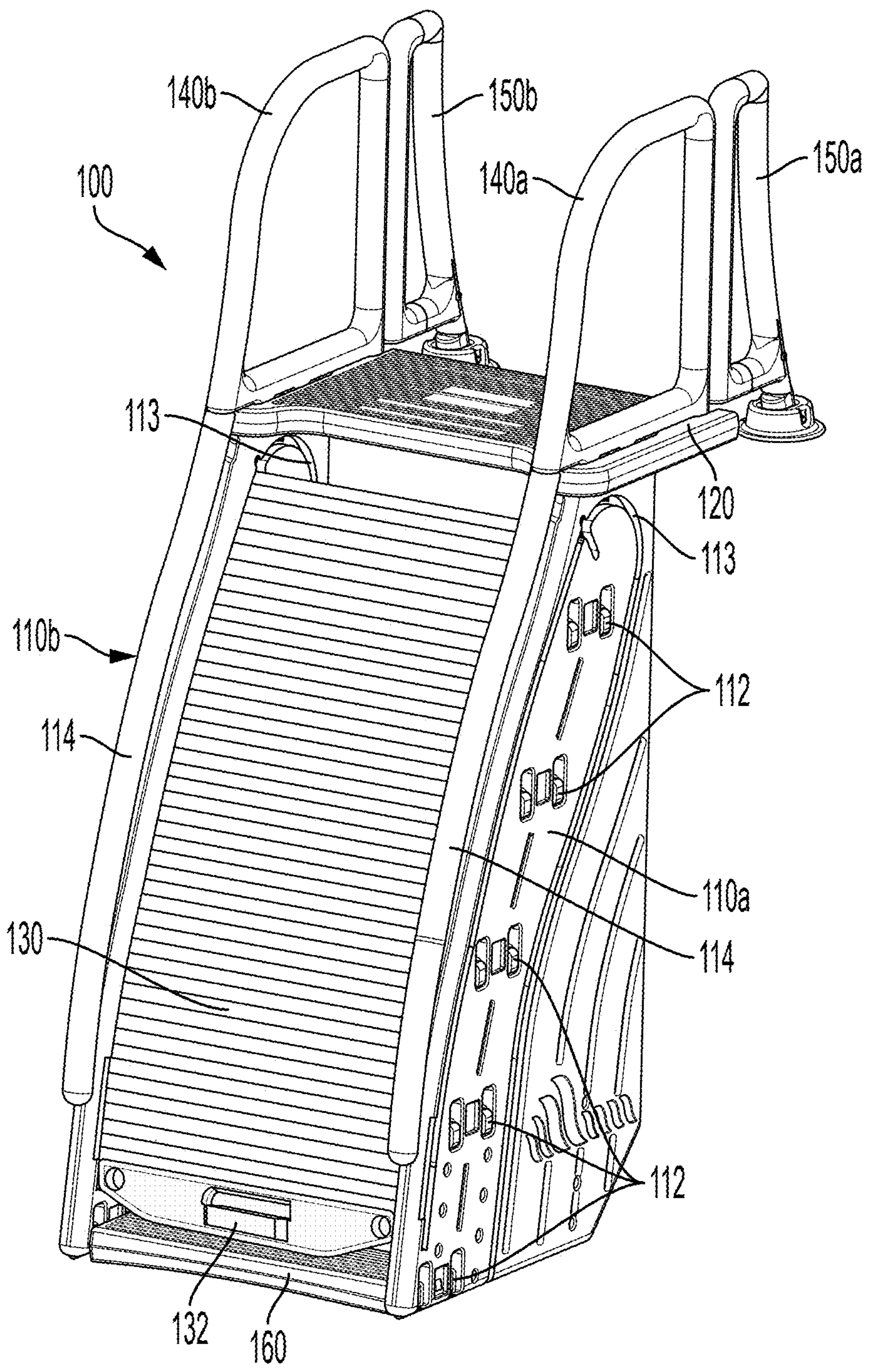
FIG. 1 is a perspective view of a modular ladder with a tambour barrier in a first position according to an embodiment of the present disclosure.

Corresponding reference characters indicate corresponding parts throughout the several views. The embodiments set out herein are examples only and illustrate currently preferred embodiments of the present disclosure, and such examples are not to be construed as limiting the scope of the invention in any manner.

DETAILED DESCRIPTION

FIG. 1 is a perspective view of a modular ladder with a tambour barrier in a first position according to an embodiment of the present disclosure. Referring to FIG. 1, a user-adjustable, blow-molded ladder 100 for ingress or egress of an above-ground swimming pool is illustrated. Of course, it will be readily appreciated that the inventive ladder structure herein illustrated and described is not limited to this particular end use, and possesses general utility in other applications apart from this specific swimming pool environment.

Figure 2:
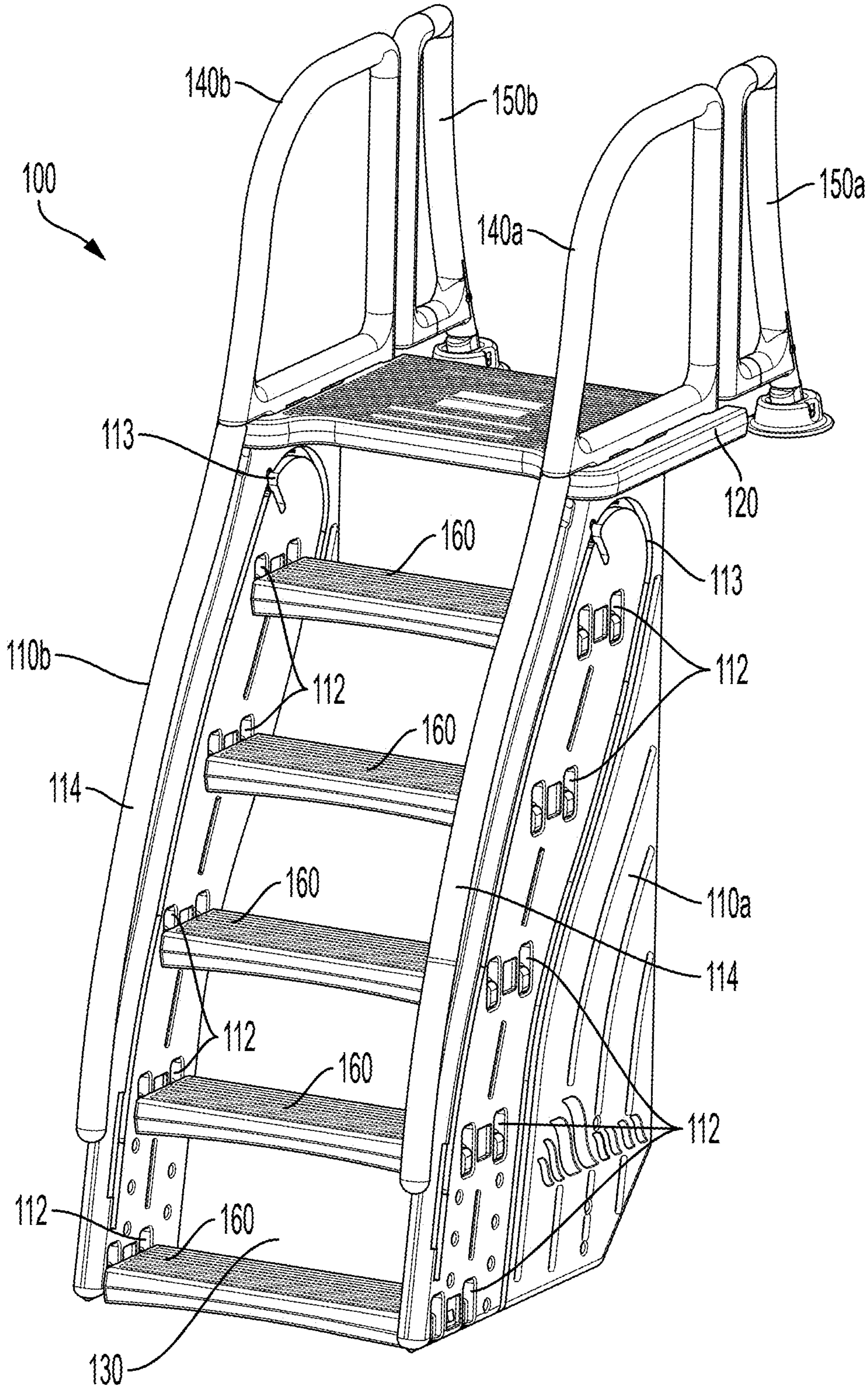
FIG. 2 is a perspective view of a modular ladder with a tambour barrier in a second position according to an embodiment of the present disclosure.

The ladder 100 includes a plurality of molded plastic parts, certain of which are identical and assembled in mirror-image relationship to provide the completed user-adjustable, blow-molded ladder 100 (FIGS. 1 and 2). At this point it will be noted that identical parts described hereafter will be designated by the same numbers, as will be apparent from the drawings. As noted above, all parts, including the tambour device, may be fabricated of molded high-density polyethylene, polypropylene and/or conventional polymers.

The ladder 100 includes a first side rail structure 110*a* opposing a second side rail structure 110*b*, a platform 120 coupled to an upper end of both the first and second side rail structures 110*a*, 110*b*, a flexible tambour barrier 130 configured to inhibit access to a plurality of steps 160 from an anterior direction when in a first position and configured to inhibit pass through entry between the steps when in a second position, and a first and second handrails 140*a*, 140*b* positioned atop and coupled to the platform 120.

The first and second side rail structures 110*a*, 110*b* may include a lower end configured to rest on a lower support surface (e.g., the bottom surface of an above-ground swimming pool or the ground around an outer wall of an above-ground swimming pool), a first upper end configured to support the platform 120 of the ladder 100, an anterior edge at which a user may ascend or descend the ladder 100, and a posterior edge which may be placed proximate to a wall of an above ground pool or other apparatus with which the ladder may be utilized. The first and second side rail structures 110*a*, 110*b* may each include apertures 112 formed therein and configured to receive respective ends of each of the plurality of steps to be supported by the first and second side rail structures 110*a*, 110*b*, and a groove 113 beginning at the lower end between a lowermost aperture 112 and the anterior edge of the side rail structure 110*a*, 110*b*, extending substantially parallel to the anterior edge towards the upper end of the side rail structure 110*a*, 110*b*, traversing the side rail structure 110*a*, 110*b* towards the posterior edge of the side rail structure between an uppermost aperture 112 and the upper end, and proceeding toward the lower end of the side rail structure 110*a*, 110*b*, terminating between the lower most aperture 112 and the posterior edge. The groove 113 has a width and depth that allows the flexible tambour barrier 130 to move freely up and down.

In some embodiments, the apertures 112 may be distributed at even intervals beginning proximate to the first lower end and extending towards the first upper end. For example, the apertures 112 may have a vertical separation of 6-14 inches and positioned such that the lowest step 160, when installed, rests on a bottom support surface. In some embodiments, the apertures 112 may include pairs of apertures 112 sitting side-by-side with a space between the inner edges of each pair of apertures 112. Additionally, the apertures 112 may be horizontally displaced as they extend towards the first upper end in a stepwise fashion.

In certain embodiments, the first and second side rail structures 110*a*, 110*b* may further include an integral railing 114 to aid a user in balancing while ascending or descending the ladder 100. In some embodiments, the two largest surfaces of the first and second side rail structures 110*a*,

110*b* may be substantially identical. That is, any rails, grooves, apertures, holes, protrusions, tabs, and the like found on a first of the largest surfaces of the side rail structures 110*a*, 110*b* may be mirrored on an opposing surface of the side rail structures 110*a*, 110*b*, thereby making the first side rail structure 110*a* interchangeable with the second side rail structure 110*b*. The interchangeability of the first side rail structure 110*a* with the second side rail structure 110*b* may simplify manufacturing and distribution of the ladder 100.

The platform 120 is coupled to an upper end of both the first and second side rail structures 110*a*, 110*b*. The platform 120 may be further coupled to the first and second handrails 140*a*, 140*b*. In some embodiments, the first and second handrails 140*a*, 140*b*, the upper ends of the first and second side rail structures 110*a*, 110*b*, and the platform 120 may interlock together providing rigidity to an upper portion of the ladder.

The flexible tambour barrier 130 includes a first side, a second side, a manipulation means 132 (e.g., a handle, a recess, an aperture, or the like) and is configured such that the first side of the flexible tambour barrier 130 is seated in the groove 113 of the first side rail structure 110*a* and the second side of the flexible tambour barrier 130 is seated in the groove 113 of the second side rail structure 110*b*. The groove 113 has a width and a depth that allows the flexible tambour barrier 130 to move freely up and down. As a result, the flexible tambour barrier 130 may be moved from a first position, which inhibits access to the plurality of steps 160 from an anterior direction to a second position, which reveals the steps for use and inhibits pass through between the plurality of steps 160. In certain embodiments, the ladder 100 may include one or more locking mechanisms to secure the tambour in a first position when outside the pool and prevent access to the plurality of steps 160 from an anterior direction. Locking the tambour in the first position and preventing access to the plurality of steps 160 may be beneficial in limiting unauthorized use of an associated above-ground pool.

In some embodiments, the first and second handrails 140*a*, 140*b* may be coupled to a first and second mounting assembly 150*a*, 150*b*. The first and second mounting assembly 150*a*, 150*b* may be used to secure ladder 100 to a pool deck or platform, this being an option rather than attaching to a second ladder system to form an A-Frame ladder system as discussed above. The first and second mounting assembly 150*a*, 150*b* may be height adjustable to accommodate a variety of deck or platform heights. Further, the first and second mounting assembly 150*a*, 150*b* may include a base or feet to securely affix first and second mounting assembly 150*a*, 150*b* to the deck or platform and provide additional stability to the ladder 100.

FIG. 2 is a perspective view of a modular ladder with a tambour barrier in a second position according to an embodiment of the present disclosure. Referring to FIG. 2, the flexible tambour barrier 130 may be moved along the groove 113 from a first position, which is substantially parallel to the anterior edges of the first and second side rail structures 110*a*, 110*b*, to a second position, which is between the plurality of steps 160 and the posterior edges of the first and second side rail structures 110*a*, 110*b*. Moving the flexible tambour barrier 130 from the first position to the second position provides access to the plurality of steps from the anterior direction and inhibits pass through entry between the plurality of steps 160.

Figure 3A:
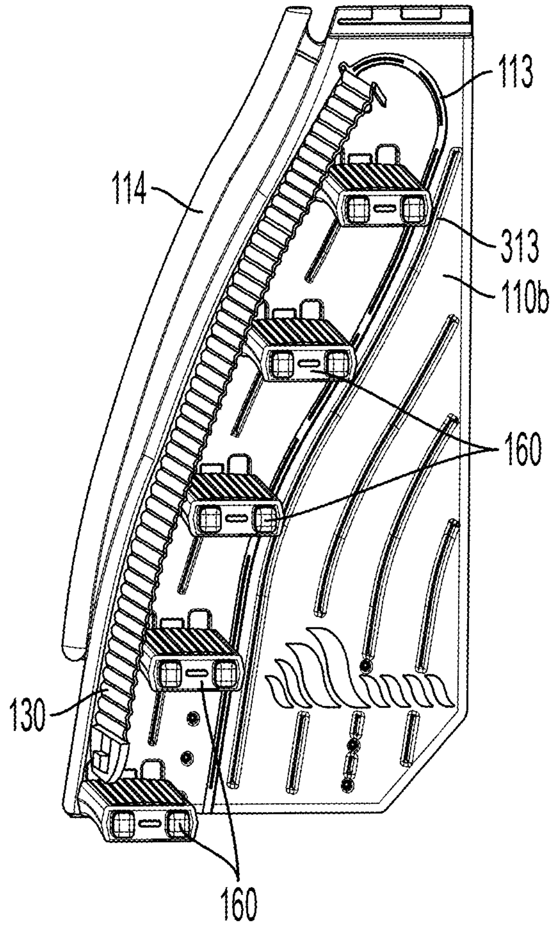
FIGS. 3A and 3B are perspective sectional views of a modular ladder with a tambour barrier in a first position and a second position, respectively, according to embodiments of the present disclosure.
Figure 3B:
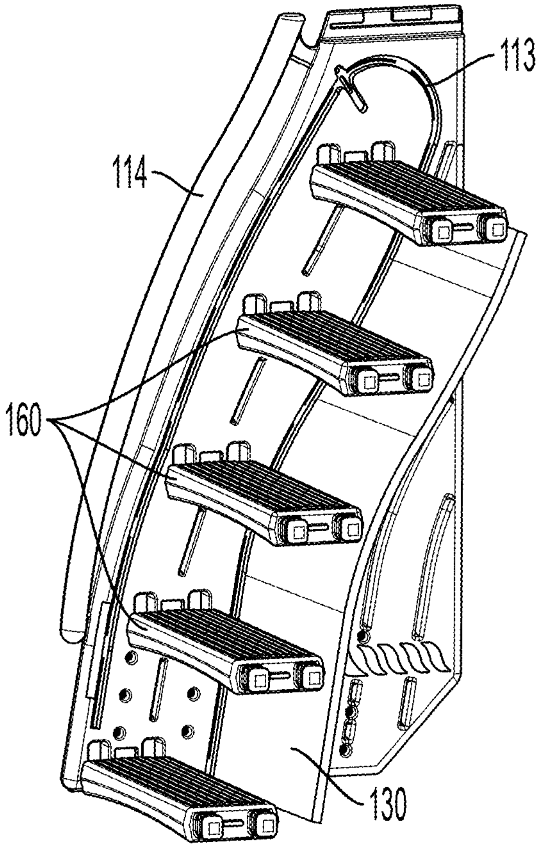

FIGS. 3A and 3B are perspective sectional views of a modular ladder with a tambour barrier in a first position and a second position according to embodiments of the present disclosure. Referring to FIGS. 3A and 3B, the flexible tambour barrier 130 may be moved along the groove 113 from a first position, which inhibits access to the plurality of steps 160 from an anterior direction, to a second position, which inhibits pass through entry between the plurality of steps 160. In certain embodiments the groove 113 curves up and over the steps 160 and follows behind the steps. The flexible tambour barrier 130 can slide along the groove 113 until it reaches the end of the groove 113. In this position the flexible tambour barrier 130 is behind the steps 160, thereby preventing undesired access to the region behind the steps 160.

In some configurations, the ladder 100 may regularly occupy an interior portion of an above-ground pool. For example, a ladder 100 may be mounted to a deck or platform or may be mounted to a second ladder 100 to form an A-frame ladder and continually extend into the pool. In such instances, an unsafe situation may arise by allowing the flexible tambour barrier 130 to be moved into the first position, thereby preventing access to the plurality of stairs while in the water. In such instances, the flexible tambour barrier 130 may be installed in the groove 113, thereby fixing the flexible tambour barrier 130 in the second position. Installing the flexible tambour barrier 130 in the groove in the second position 113 inhibits pass through entry between the plurality of steps 160 and provides continual access to the plurality of steps 160 from the pool.

Figure 4:
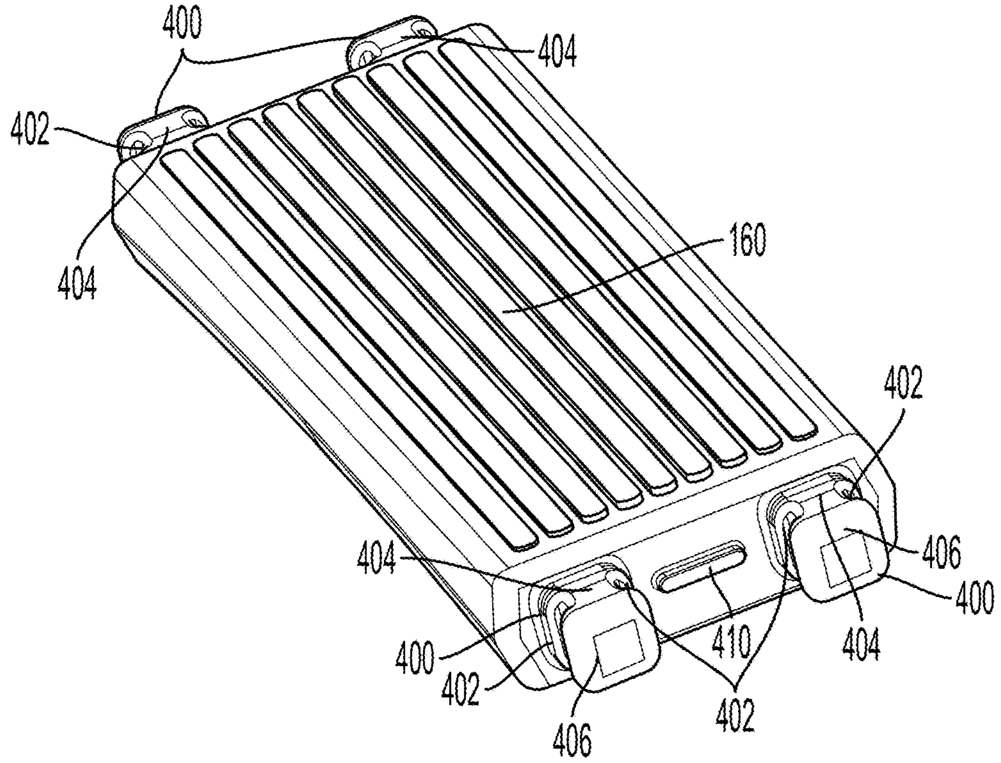
FIG. 4 is a perspective view of a step and its male interconnections according to an embodiment of the present disclosure.

FIG. 4 is a perspective view of a step and its male interconnections according to an embodiment of the present disclosure. Referring to FIG. 4, a step 160 of the plurality of steps may include a first end and a second end and is configured to couple with corresponding apertures 112 of the first and second side rail structures 110*a*, 110*b*. In some embodiments, the first end of each of the plurality of steps 160 may include one or more male interconnections 400.

Protruding from the first end and the second end of the step 160 is a male interconnection 400. The male interconnection 400 can have numerous and various configurations. A fundamental feature of each male interconnection 400 is that it has an insertion section 404 and a locking section 406. Generically, the insertion section 404 is essentially perpendicular in relation to the first and second end of the steps 160. The insertion section 404 is defined by at least one adjacent recess 402, and the locking section 406 is angled, preferably perpendicular, to the insertion section 404. Exemplary configurations of the male interconnection 400 include and are not limited to the "T" shape, the "J" shape, an "L" shape, a serpentine shape, a zig-zag shape, and variations thereof. The insertion section 404 is a narrow section with a predetermined height, a predetermined width, and a predetermined length. The predetermined height, length and width correspond with the apertures 112 of the first and second side rail structures 110*a*, 110*b*.

In some embodiments, the first end and the second end of the step 160 may each include two male interconnections 400. The two male interconnections 400 may be separated from and symmetric about a longitudinal axis of the step 160. In some embodiments, the first and second end of the steps 160 may include a locking ridge 410 positioned between the two male interconnections 400. For example, the locking ridges 410 found at each end of the step 160 may be centered on the longitudinal axis of the step 160. In other instances, the locking ridge 410 found at each end of the step 160 may be positioned slightly above or slightly below the longitudinal axis of the step 160.

Figure 5:
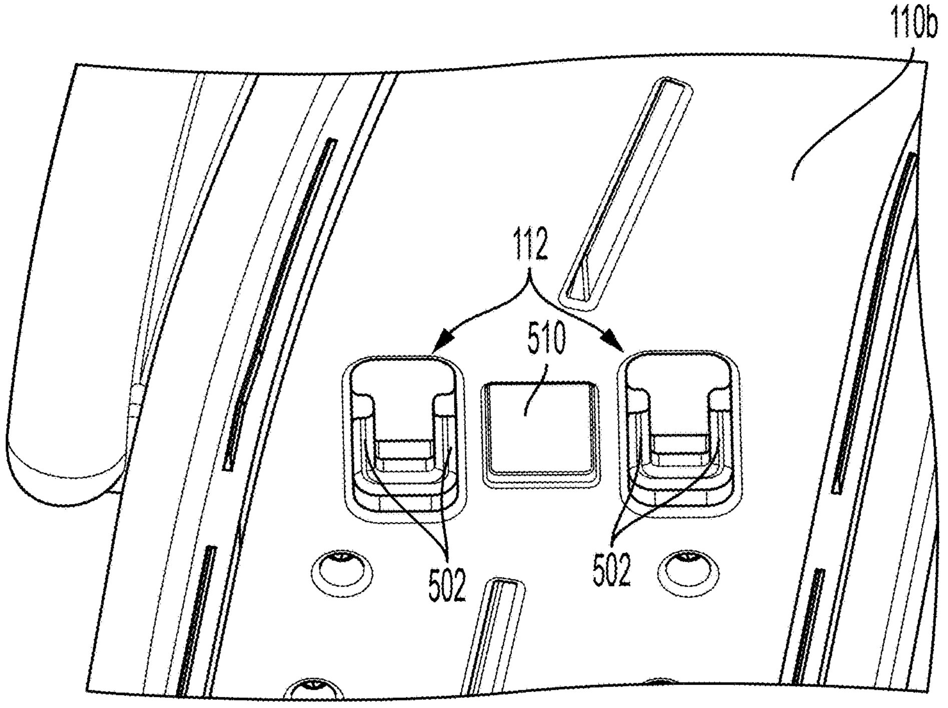
FIG. 5 is a view of apertures of a rail structure configured to receive the male interconnections of a step according to an embodiment of the present disclosure.

FIG. 5 is a view of apertures of a rail structure configured to receive the male interconnections of a step according to an embodiment of the present disclosure. Referring to FIG. 5, the second rail structure 110*b* may include pairs of apertures 112 configured to receive the two male interconnections 400 found at each end of each step 160. Inner longitudinal surfaces of the apertures 112 may include one or more protrusions 502 positioned to nest within the one or more recesses 402 of the male interconnections 400. In some embodiments, the second rail structure 110*b* may further include recesses 510 positioned between the pair apertures 112 that are configured to receive the locking ridge 410 found between the male interconnections 400.

Figure 6:
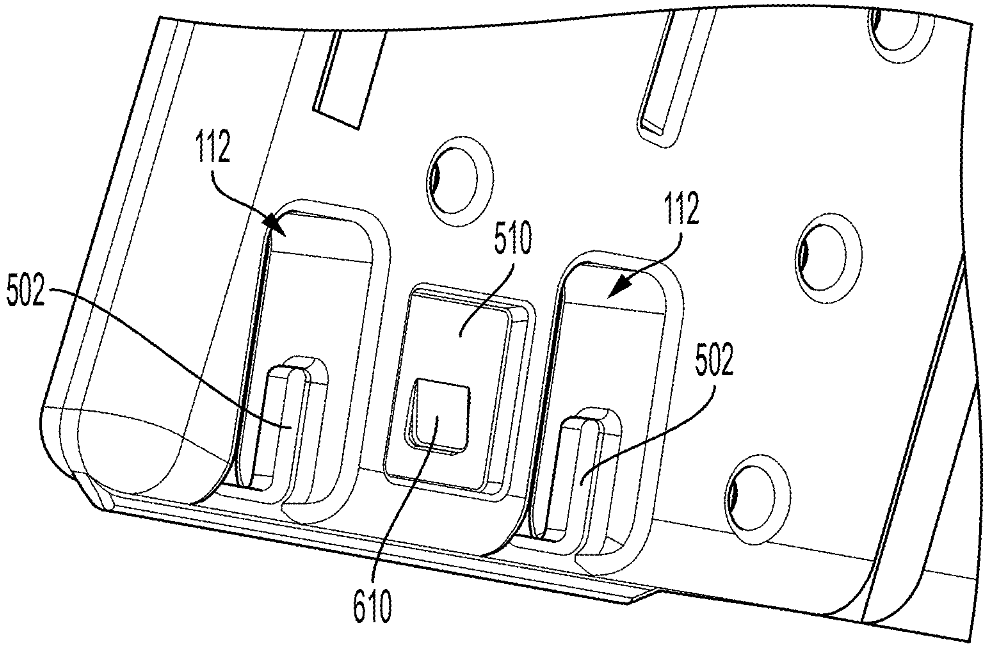
FIG. 6 is a view of apertures of a rail structure and corresponding locking tab according to an embodiment of the present disclosure.

FIG. 6 is a view of apertures of a rail structure and a corresponding locking tab according to an embodiment of the present disclosure. Referring to FIG. 6, in some embodiments of the disclosure, one or more recesses 510 of the first side rail structure 110*a* or the second side rail structure 110*b* may include a ramped locking tab 610 positioned to engage with locking ridge 410. After the male interconnections 400 are inserted into the apertures 112 and the locking sections 406 of the male interconnections 400 extend laterally beyond the one or more protrusions 502 of the apertures 112, the recesses 510 receive the locking ridges 410. Male interconnections 400 are subsequently moved towards the one or more protrusions 502 so that the one or more protrusions 502 nest within the one or more recesses 402. As the male interconnections 400 are moved alongside the one or more protrusions 502, the locking ridges 410 of the step 160 engage the ramped locking tabs 610. When fully seated within the apertures 112, an edge of the locking ridges 410 rigidly engage a terminal lip of the ramped locking tabs 610 within the recesses 510 of the first and second side rail structures 110*a*, 110*b*.

Figure 7:
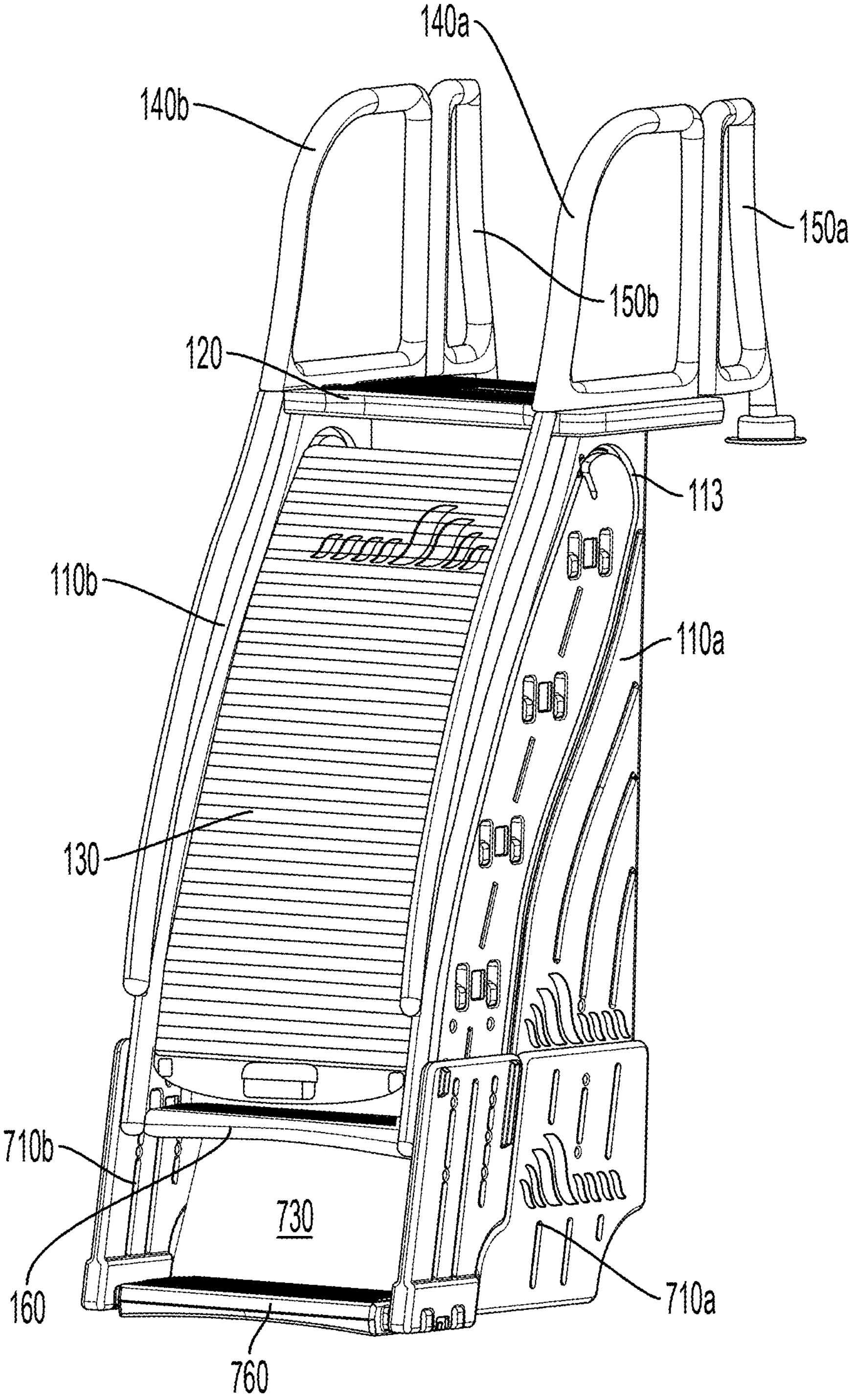
FIG. 7 is a perspective view of a modular ladder mounted on an extension boot assembly according to an embodiment of the present disclosure.

FIG. 7 is a perspective view of a modular ladder mounted on an extension boot assembly according to an embodiment of the present disclosure. Referring to FIG. 7, in some instances it may be beneficial to elevate the ladder 100. For example, a height between the platform 120 and the ground may be insufficient to mount the ladder 100 to a deck or platform or extend the platform 120 over a side wall of a pool. Accordingly, certain embodiments of the present disclosure provide an extension boot assembly configured to couple to the first and second side rail structures 110*a*, 110*b* to elevate the ladder 100 12 inches or more. For example, an extension boot assembly may raise the platform 120 from 48 inches above the ground to 60 inches above the ground.

The extension boot assembly includes a first side extension 710*a*, a second side extension 710*b*, a barrier extension 730, and a bottom extension step 760. When installed, the barrier extension 730, which may be separate (see FIG. 10A) but is preferably integrally formed (see FIG. 10B) with the flexible tambour barrier 130, may be placed in a posterior position and fixed in the second position. Additionally, the groove 113 terminates at the lower ends of the first and second side rail structures 110*a*, 110*b*. Accordingly, the flexible tambour barrier 130 extends to a lowest most step 160 of the ladder 130 and barrier extension 730 extends to the bottom extension step 760. In the integral embodiment, a user may cut off the barrier extension if it is not needed (e.g. when installed on the outside pool ladder).

Figure 8A:
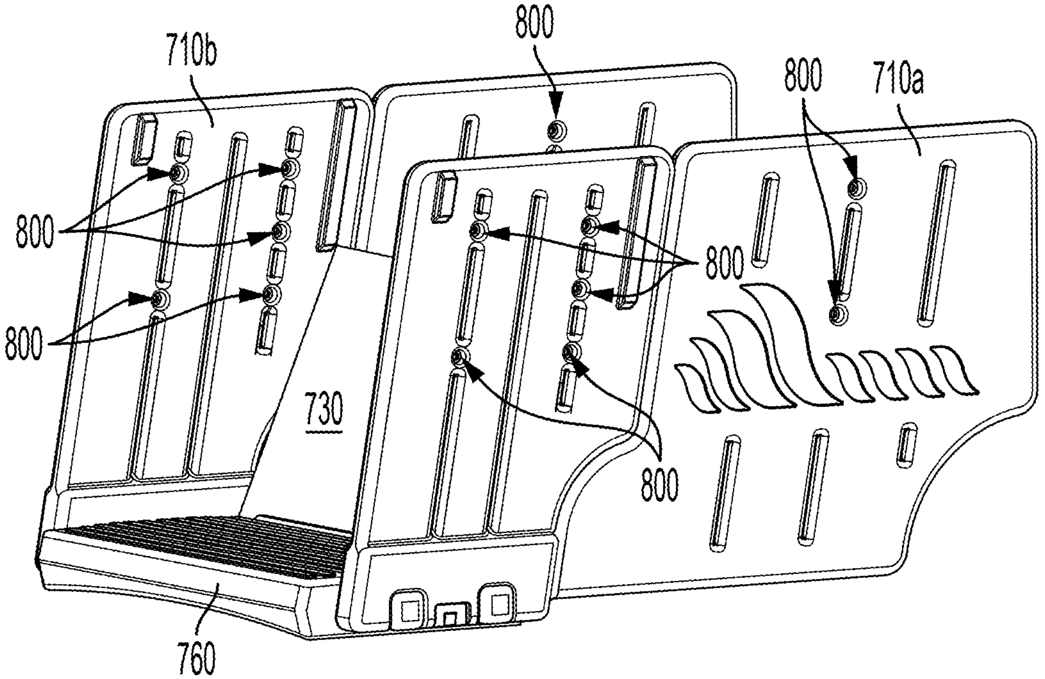
FIG. 8A is a perspective view of an extension boot assembly according to an embodiment of the present disclosure.

FIG. 8A is a perspective view of an extension boot assembly according to an embodiment of the present disclosure. Referring to FIG. 8A, the first and second side extensions 710*a*, 710*b* further include attachment holes 800 that may be aligned and coupled with corresponding holes in the first and second side rail structures 110*a*, 110*b*.

Figure 8B:
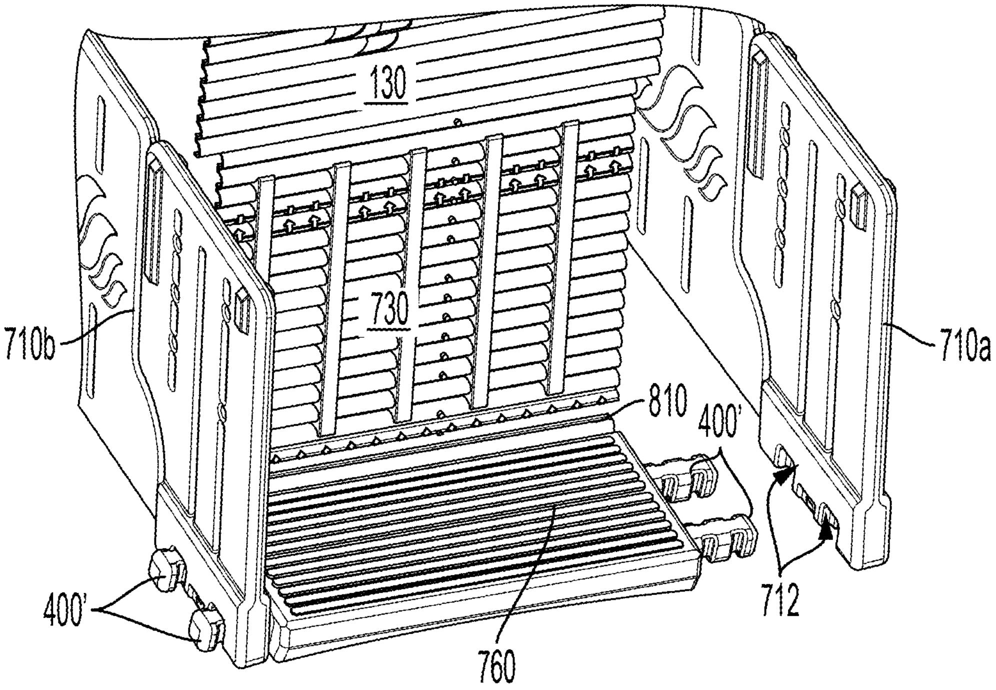
FIG. 8B is an exploded perspective view of an extension boot assembly according to an embodiment of the present disclosure.
Figure 8C:
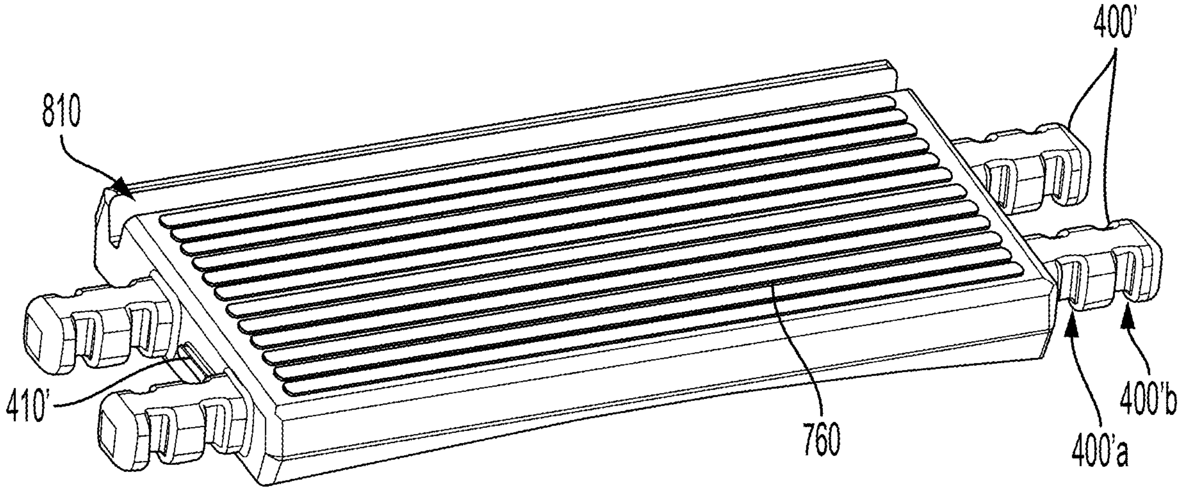
FIG. 8C is a perspective view of the extension step seen in FIG. 8B.
Figure 8D:
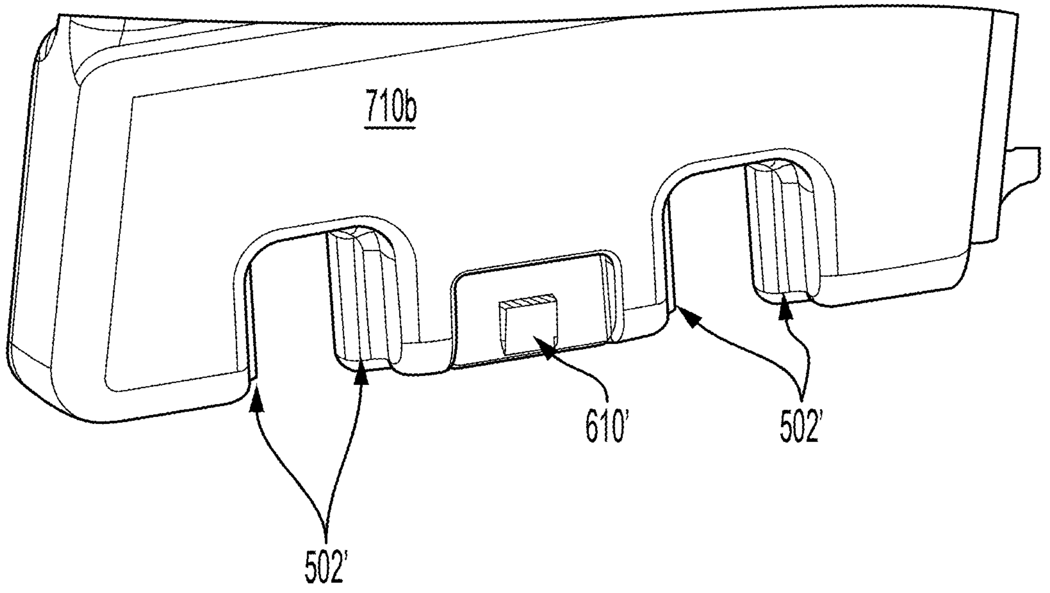
FIG. 8D is an enlarged, fragmented, perspective view of the side extension seen in FIG. 8B.

FIG. 8B is an exploded perspective view of an extension boot assembly according to an embodiment of the present disclosure. Referring to FIGS. 8A-D, extension step 760 includes an extension barrier groove 810 in which the free edge of extension barrier 730 is seated and secured (e.g., with screws) and one or more male interconnections 400' included at both a first end and a second end of extension step 760. It is noted the dimensions of bottom step 760 may be different in shape and size than steps 160 as needed for alignment and fitting purposes with the extension boot assembly and barrier groove. Additionally, the first and second side extensions 710*a*, 710*b* may further include one or more apertures 712 having one or more protrusions 502'. In certain embodiments, apertures 712 may be configured to have the one or more male interconnections 400' inserted at a lower end of the first and second side extensions 710*a*, 710*b*. In these embodiments, the first and second side extensions 710*a*, 710*b* may also include ramped locking tabs 610' oriented to engage locking ridges 410' (FIG. 8C) when the one or more male interconnections 400' are moved alongside the one or more protrusions 502', such that an edge of the locking ridges 410' rigidly engage a terminal lip of the ramped locking tabs 610'. It is noted and seen in FIG. 8C that male interconnections 400' may include one or more indentations 400'*a* and 400'*b* to allow for adjustability when mounting step 760 to the first and second side extensions 710*a*, 710*b*.

Figure 9:
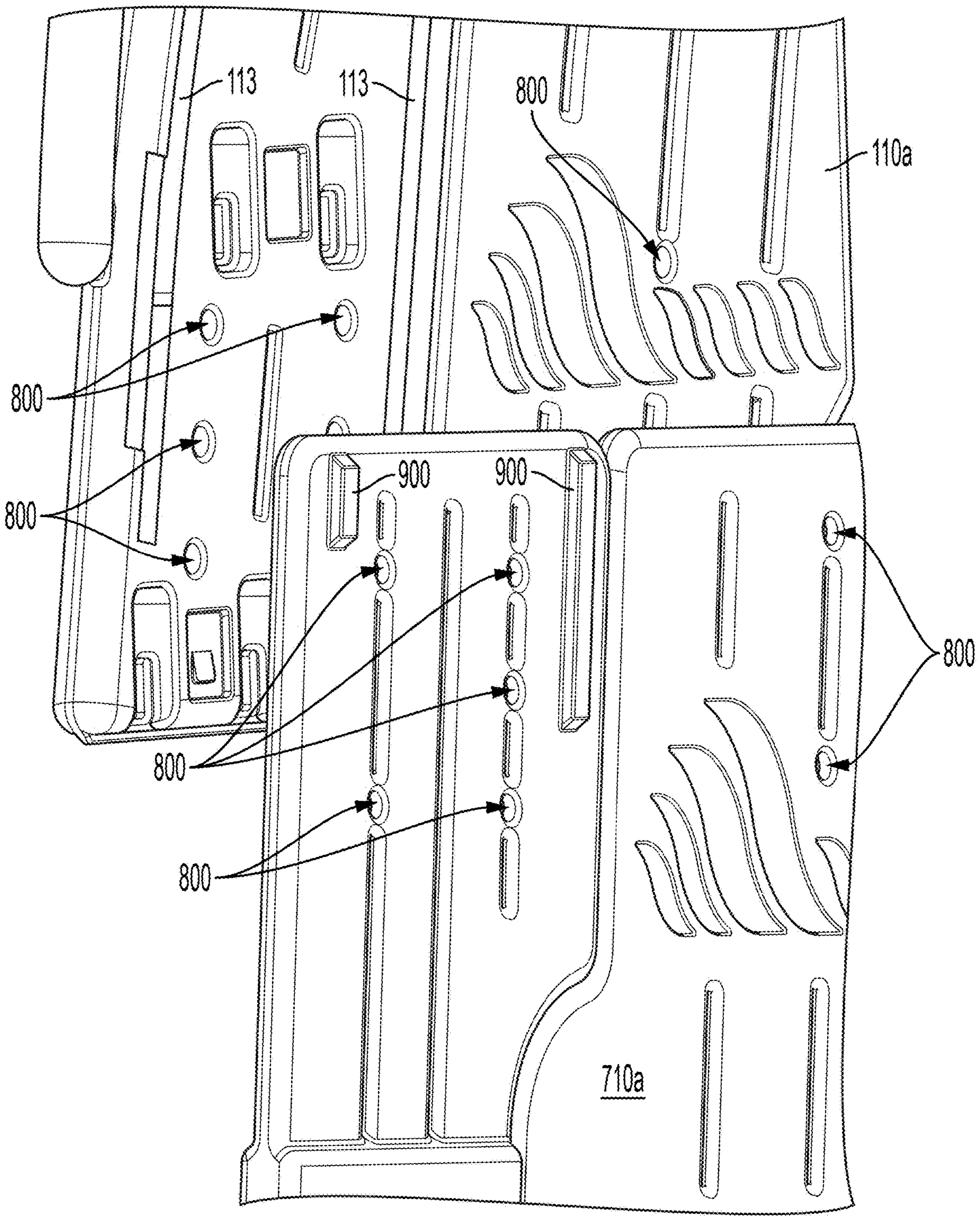
FIG. 9 illustrates a coupling configuration of a rail structure of a modular ladder and an extension boot of an extension boot assembly according to an embodiment of the present disclosure.

FIG. 9 illustrates a coupling configuration of a rail structure of a modular ladder and an extension boot of an extension boot assembly according to an embodiment of the present disclosure. Referring to FIG. 9, in some embodiments the first and second side extensions 710*a*, 710*b* may further include one or more alignment protrusions 900 positioned such that the alignment protrusions 900 may be seated in a portion of groove 113. When alignment protrusions 900 are seated in groove 113, alignment of the attachment holes 800 of the first and second side rail structures 110*a*, 110*b* and the attachment holes 800 of the first and second side extensions 710*a*, 710*b* for coupling may be simplified. Coupling the attachment holes 800 of the first and second side rail structures 110*a*, 110*b* with the attachment holes 800 of the first and second side extensions 710*a*, 710*b* may be done with any suitable fasteners. For example, the attachment holes 800 of the first and second side rail structures 110*a*, 110*b* may be coupled with the attachment holes 800 of the first and second side extensions 710*a*, 710*b* using 2 inch bolts and corresponding nuts of appropriate thickness.

Figure 10A:
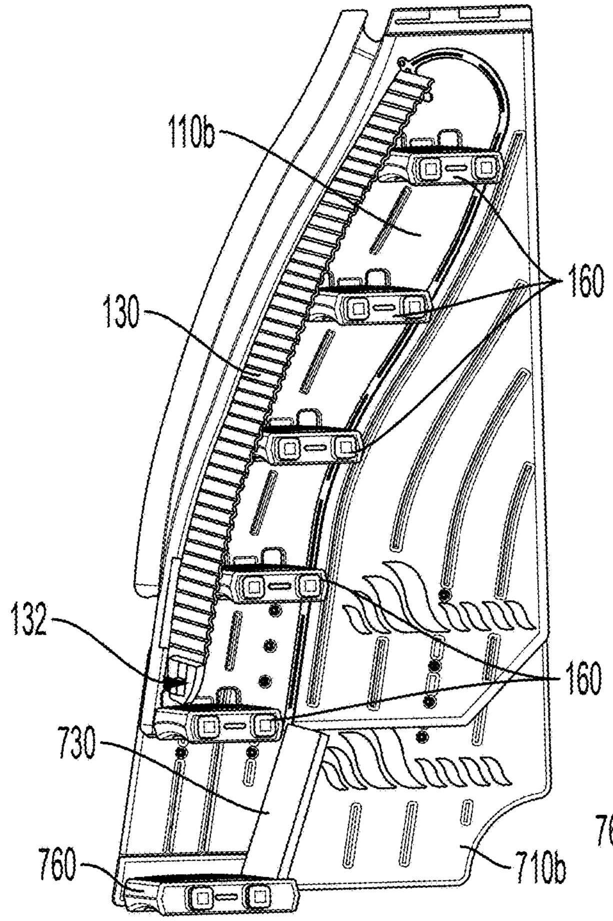
FIGS. 10A and 10B is a perspective sectional view of a modular ladder mounted on an extension boot assembly with a tambour barrier in a first position and a second position according to embodiments of the present disclosure.
Figure 10B:
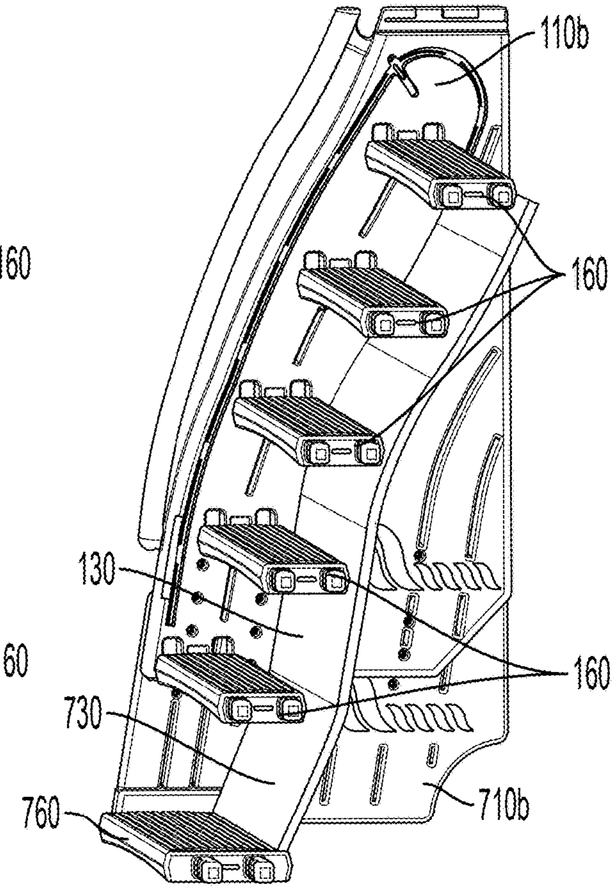

FIGS. 10A and 10B are perspective sectional views of a modular ladder mounted on an extension boot assembly with a tambour barrier in a first position and a second position according to embodiments of the present disclosure, respectively. Referring to FIG. 10A, in the first position, the manipulation means 132 (e.g., a handle, a recess, an aperture, or the like) of the flexible tambour barrier 130 may sit on or near an upper surface of a lower most step 160 of the ladder 100. In the second position seen in FIG. 10B, the flexible tambour barrier 130 may include integral barrier extension 730 which locates within groove 810 of extension step 760 barrier extension 730. When inside the pool, the tambour barrier 130 and integral barrier extension 730 are fixed in the second position so that the steps 160 are always available to egress the pool.

Figure 11A:
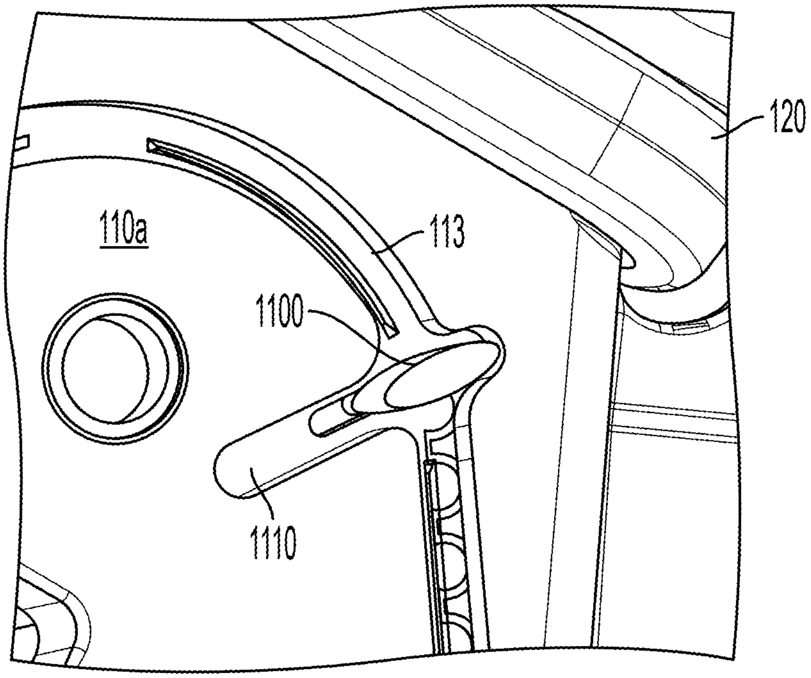
FIGS. 11A and 11B illustrate a locking mechanism configured to secure a tambour barrier in a first position according to embodiments of the present disclosure.
Figure 11B:
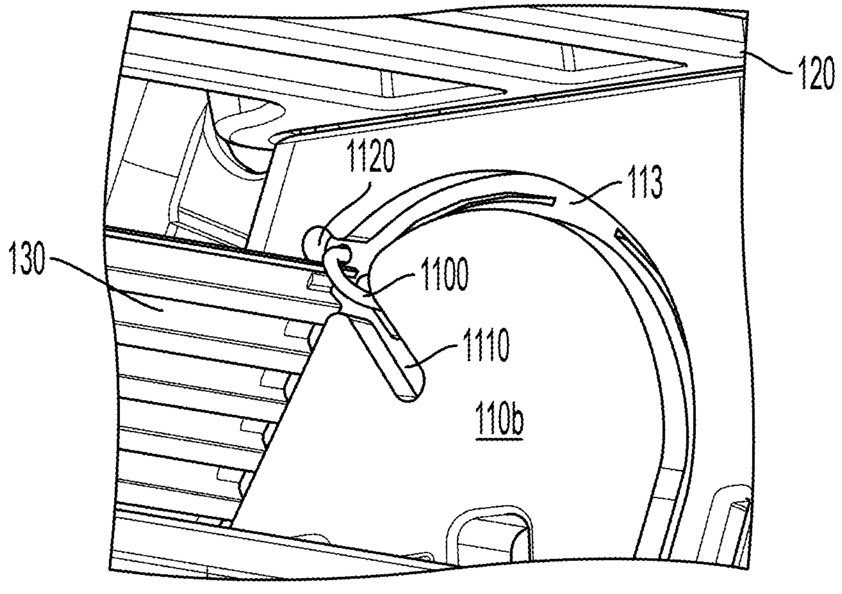

FIGS. 11A and 11B illustrate a locking mechanism configured to secure a tambour barrier in a first position according to embodiments of the present disclosure. Referring to FIGS. 11A and 11B, in certain embodiments the flexible tambour barrier 130 may be secured in the first position. For example, a locking device 1100 may be secured to the first side rail structure 110*a* or the second side rail structure 110*b* across the groove 113 just beyond the flexible tambour barrier 130, when in the first position, such that the locking device impedes the movement of the flexible tambour barrier 130 along the groove 113. In some embodiments, the first and second side rail structures 110*a*, 110*b* may have recesses 1110 and one or more holes 1120 through which a locking device 1100 may be secured. By securing the flexible tambour barrier 130 in the first position with locking device 1100, unauthorized access use of an associated above-ground pool may be limited.

As discussed above, the platform 120 is coupled to an upper end of both the first and second side rail structures 110*a*, 110*b*. The platform 120 may be further coupled to the first and second handrails 140*a*, 140*b*. In some embodiments, the first and second handrails 140*a*, 140*b*, the upper ends of the first and second side rail structures 110*a*, 110*b*, and the platform 120 may interlock together providing rigidity to an upper portion of the ladder.

Figure 12A:
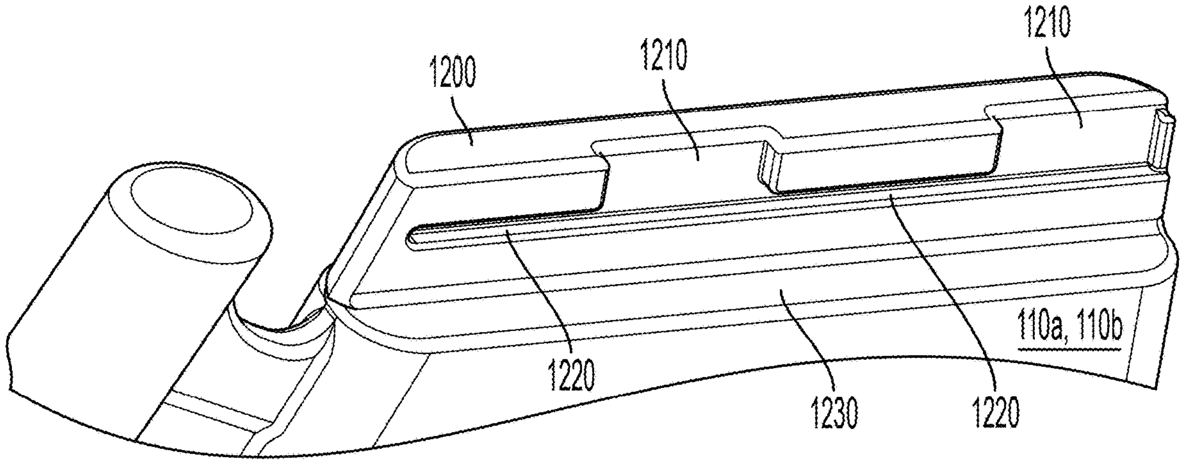
FIGS. 12A and 12B illustrate detailed views of an upper end of a side rail structure according to embodiments of the present disclosure.
Figure 12B:
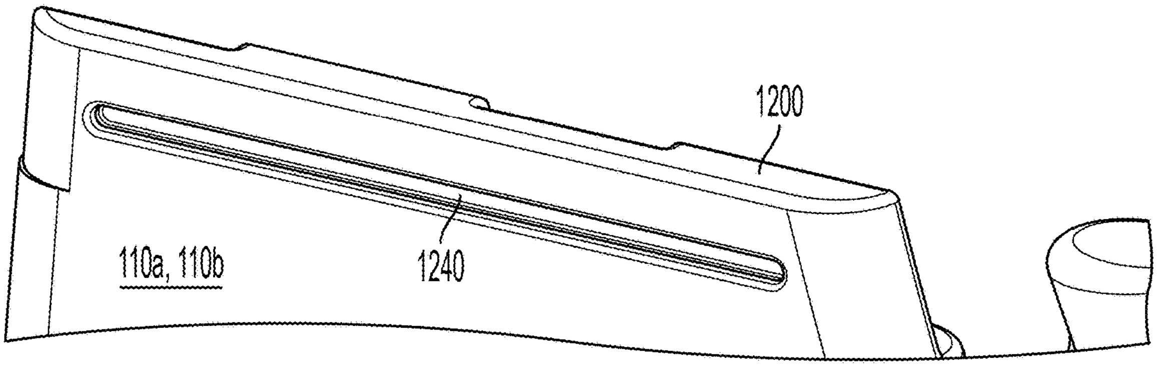

FIGS. 12A and 12B illustrate detailed views of an upper end of a side rail structure according to embodiments of the present disclosure. Referring to FIGS. 12A and 12B, the upper end of the first and second side rail structures 110*a*, 110*b* may include an upper surface 1200, a recess forming receiver 1210 and a channel 1220, and ledge 1230 along a first surface of the first and second side rail structures 110*a*, 110*b*, as illustrated in FIG. 12A, and a channel 1240 along a second surface of the first and second side rail structures 110*a*, 110*b*, as illustrated in FIG. 12B.

Figure 13A:
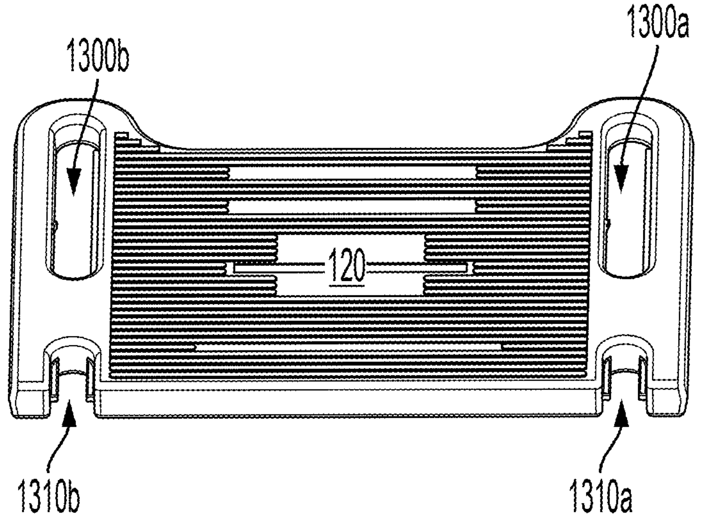
FIGS. 13A and 13B illustrate detailed views of a platform with openings configured to receive an upper end of a side rail structure according to embodiments of the present disclosure.
Figure 13B:
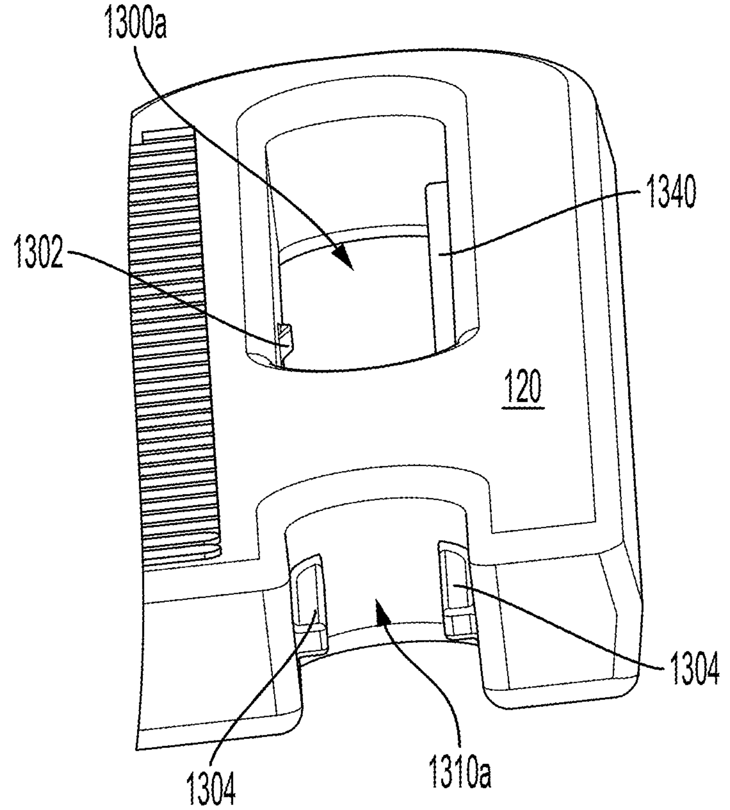

FIGS. 13A and 13B illustrate detailed views of a platform with openings configured to receive an upper end of a side rail structure according to embodiments of the present disclosure. Referring to FIGS. 13A and 13B, the platform 120 includes a first pair of openings 1300*a*, 1300*b* configured to receive an upper end of the first and second side rail structures 110*a*, 110*b* and a second pair of opening 1310*a*, 1310*b*. The first pair of openings 1300*a*, 1300*b* each include a ramped locking tab 1302 and a protrusion 1340. The protrusion 1340 is configured to engage the channel 1240 of the upper end of a corresponding side rail structure 110*a*, 110*b*.

The second pair of openings 1310*a*, 1310*b* may include one or more protrusions 1304. In some embodiments, the ramped locking tab 1302 and the one or more protrusions 1304 are configured to couple to the first and second handrails 140*a*, 140*b* as described below.

Figure 14:
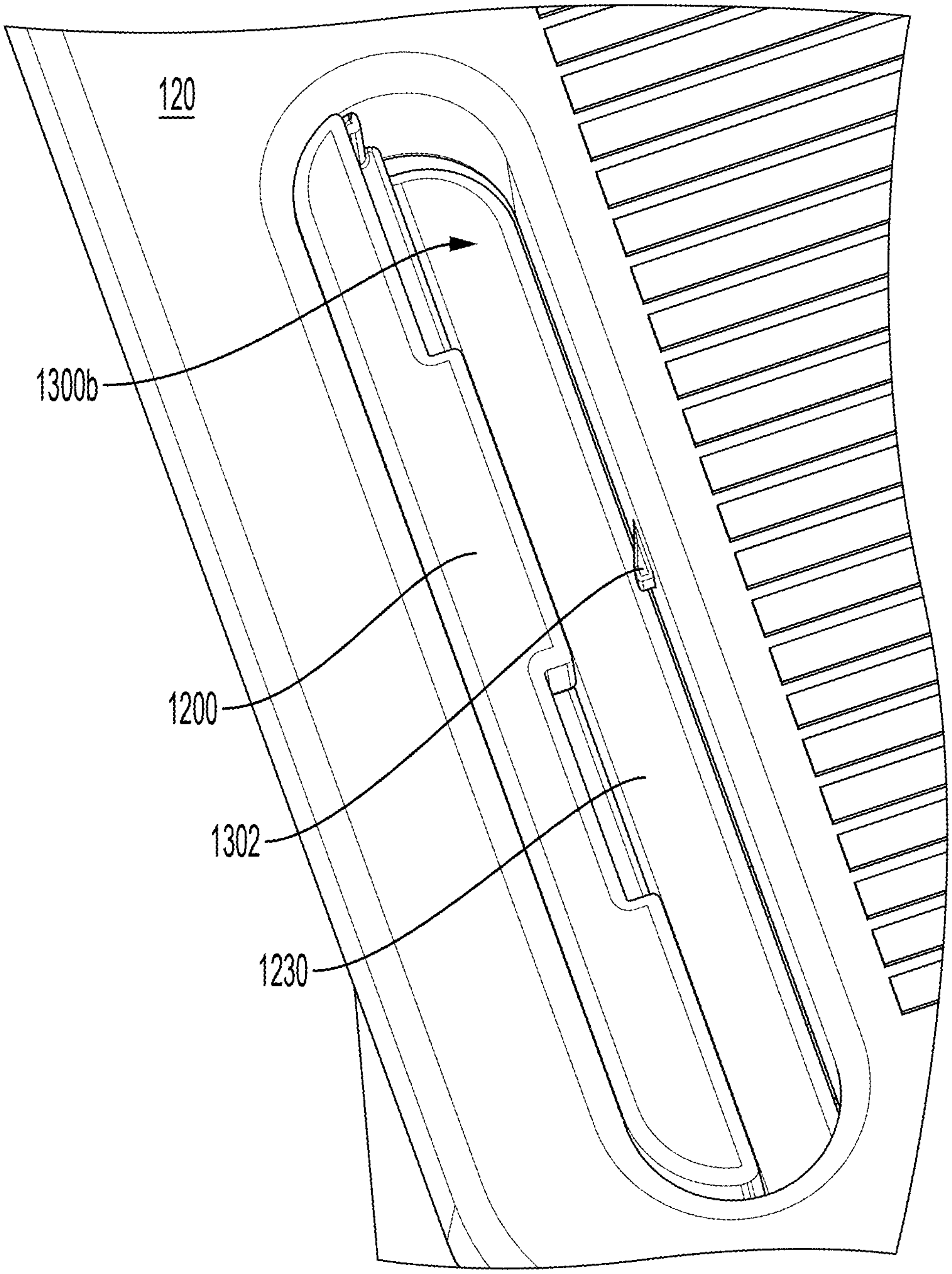
FIG. 14 illustrates a detailed view of a platform opening coupled to an upper end of a side rail structure according to an embodiment of the present disclosure.

FIG. 14 illustrates a detailed view of a platform opening coupled to an upper end of a side rail structure according to an embodiment of the present disclosure. Referring to FIG. 14, the platform 120 includes the opening 1300*b* where the protrusion 1340 on an inner surface of the opening 1300*a* is seated in channel 1240 of the upper end of the first side rail structure 110*a*. Accordingly, the upper surface 1200 of the upper end of the first side rail structure 110*a* is substantially level with an upper surface of the platform 120, and ledge 1230 is substantially level with a lower surface of the platform 120.

Figure 15A:
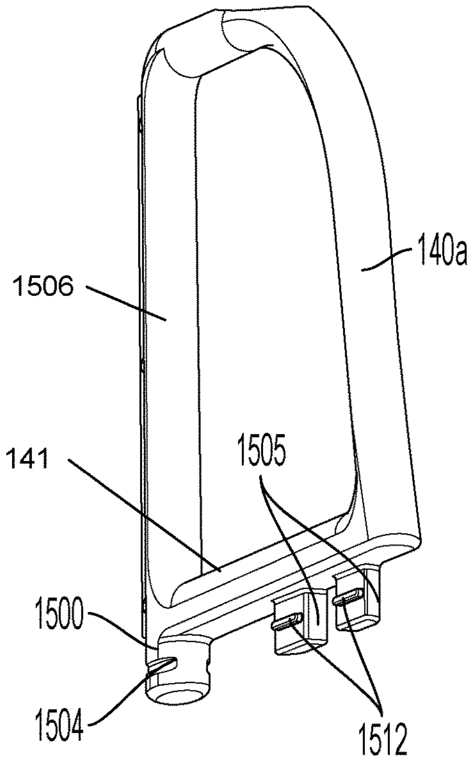
FIGS. 15A and 15B illustrate detailed views of a handrail configured to interlock with an upper end of a side rail structure within an opening of a platform according to embodiments of the present disclosure.
Figure 15B:
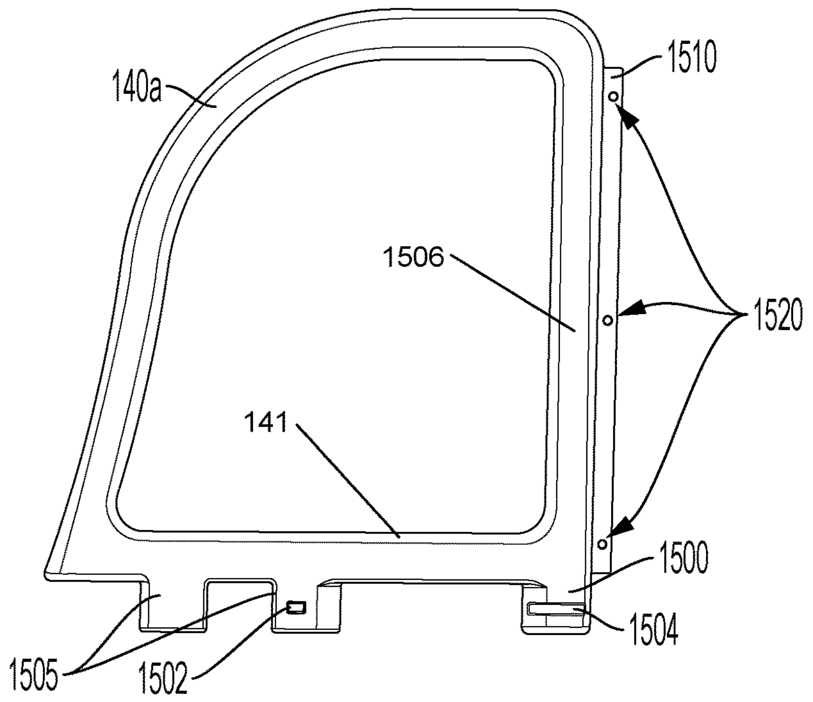

FIGS. 15A and 15B illustrate detailed views of a handrail configured to interlock with an upper end of a side rail structure within an opening of a platform according to embodiments of the present disclosure. Referring to FIGS. 15A and 15B, the first and second handrails 140*a*, 140*b* each include a lower member 141 from which a posterior locking lug 1500 and at least one anterior locking lug 1505 and a coupling flange 1510 extending along a length of a member 1506 of the respective handrails 140*a*, 140*b*. The coupling flange 1510 includes a plurality of coupling holes 1520 which may be used to couple the ladder 100 to a mounting bracket assembly, a corresponding coupling flange 1510 of a second ladder 100, or any other ladder of suitable style and structure.

The posterior locking lug 1500 may be an integral extension of the member 1506 of the handrail along which the coupling flange extends. Posterior locking lug 1500 may include one or more channels 1504 configured to couple with the one or more protrusions 1304 of the corresponding opening of the second pair of openings (e.g., the opening 1310*a*) of the platform 120. That is, the one or more protrusions 1304 of the opening 1310*a* may be seated in the corresponding one or more channels 1504 of the posterior locking lug 1500.

The anterior locking lugs 1505 may include a one or more locking protrusions 1512 on a first surface of the anterior locking lugs 1505 configured to engage with the locking channel 1220 of the upper end of a corresponding side rail structure 110*a*, 110*b*. Anterior locking lugs 1505 may further include a recess 1502 configured to engage with the ramped locking tab 1302 of the platform 120. Additionally, the anterior locking lugs 1505 are configured to align with receivers 1210 of the upper end of the corresponding first or second side rail structure 110*a*, 110*b*, such that when the anterior locking lugs 1505 are fully seated in the corresponding opening 1300*a*, 1300*b* within the receivers 1210 and moved in an anterior direction, a bottom surface of the anterior locking lugs 1505 rests on the ledge 1230, and the one or more locking protrusions 1512 are seated within the locking channel 1220 of the upper end of the corresponding first or second side rail structure 110*a*, 110*b*, thereby providing a bilateral, interlocked rigidity to an upper portion of the ladder 100.

Figure 16A:
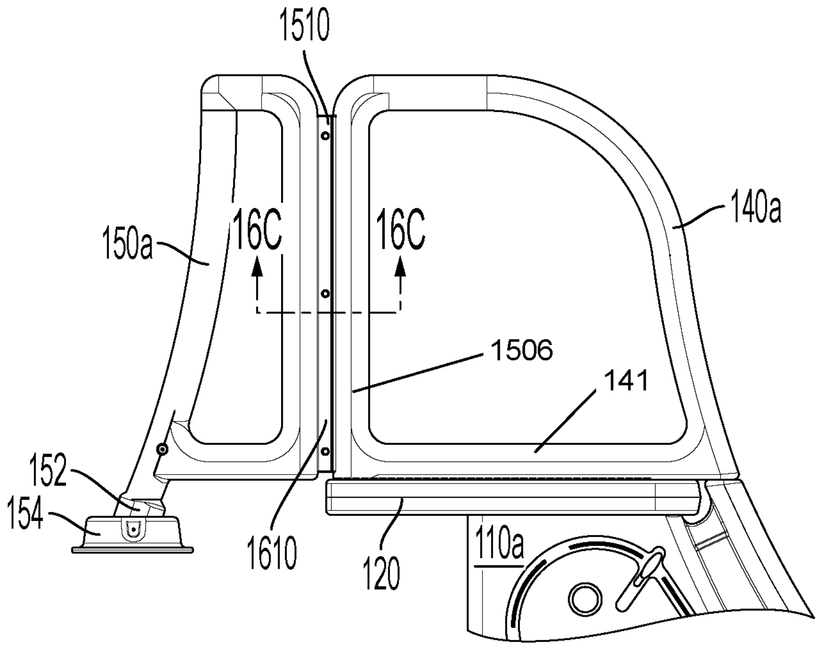
FIGS. 16A-16C illustrate a coupling configuration of a handrail of a modular ladder and a mounting bracket assembly according to embodiments of the present disclosure.
Figure 16B:
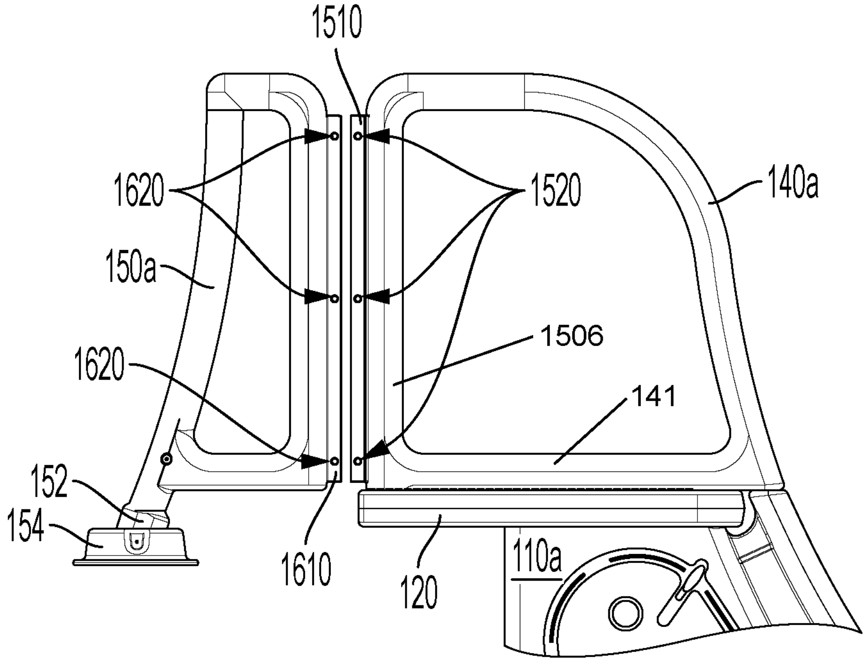
Figure 16C:
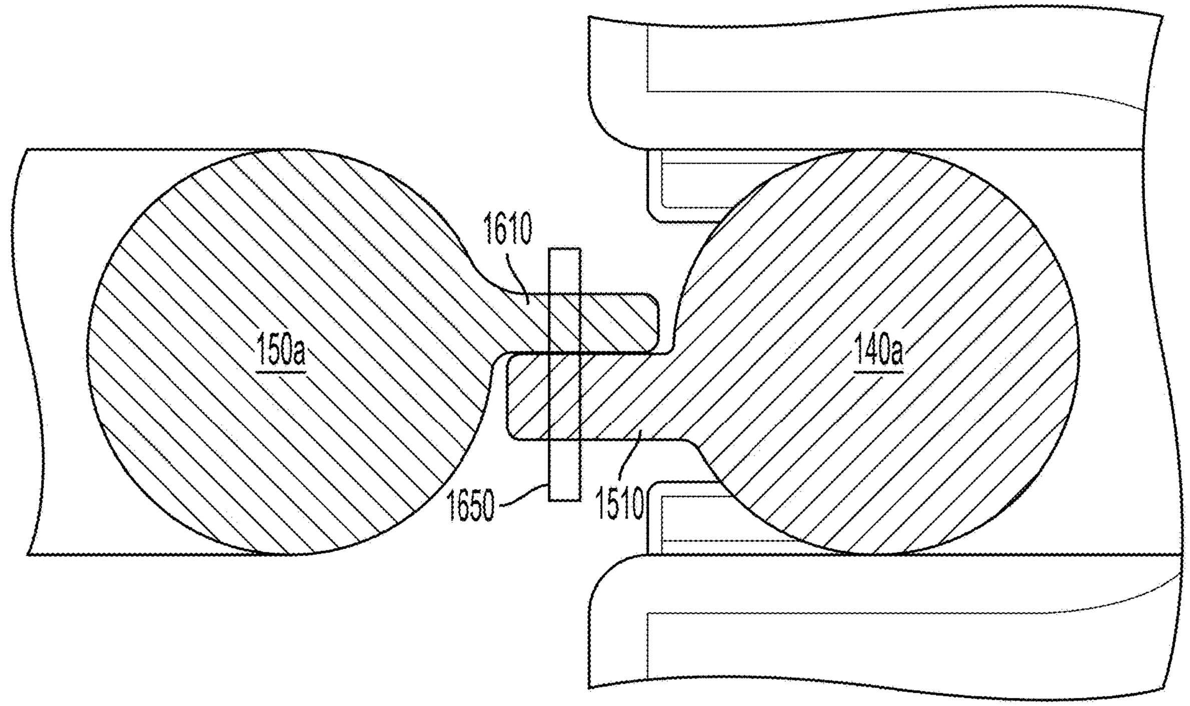

FIGS. 16A-16C illustrate a coupling configuration of a handrail of a modular ladder and a mounting bracket assembly according to embodiments of the present disclosure. Referring to FIGS. 16A and 16B, the first and second handrails 140*a*, 140*b* may be coupled, via a coupling flange 1510, to a coupling flange 1610 of the first and second mounting assemblies 150*a*, 150*b*. The first and second mounting assemblies 150*a*, 150*b* may each include a telescoping arm 152 positioned within a hollow portion of a posterior member 150*a* of the respective mounting assembly, a mounting foot 154 pivotally affixed to a distal end of the telescoping arm 152, and a coupling flange 1610 extending along a length of an anterior member of the respective mounting assembly. The first and second mounting assemblies 150*a*, 150*b* may be height adjustable by way of the telescoping arms 152 to accommodate a variety of deck or platform heights. Further, the coupling flange 1610 of the first and second mounting assemblies 150*a*, 150*b* may include a plurality of attachment holes 1620 corresponding to a plurality of attachment holes 1520 of the coupling flange 1510 of the first and second handrails 140*a*, 140*b*.

As illustrated in FIG. 16C, coupling flange 1610 of the first and second mounting assemblies 150*a*, 150*b* may be positioned immediately adjacent to coupling flange 1510 of the first and second handrails 140*a*, 140*b*. Coupling the attachment holes 1620 of the coupling flange 1610 with the attachment holes 1520 of the coupling flange 1510 may be done with any suitable fasteners 1650. For example, the attachment holes 1620 of the coupling flange 1610 may be coupled with the attachment holes 1520 of the coupling flange 1510 using ¾ inch bolts and corresponding nuts and washers of appropriate thickness.

Figure 17:
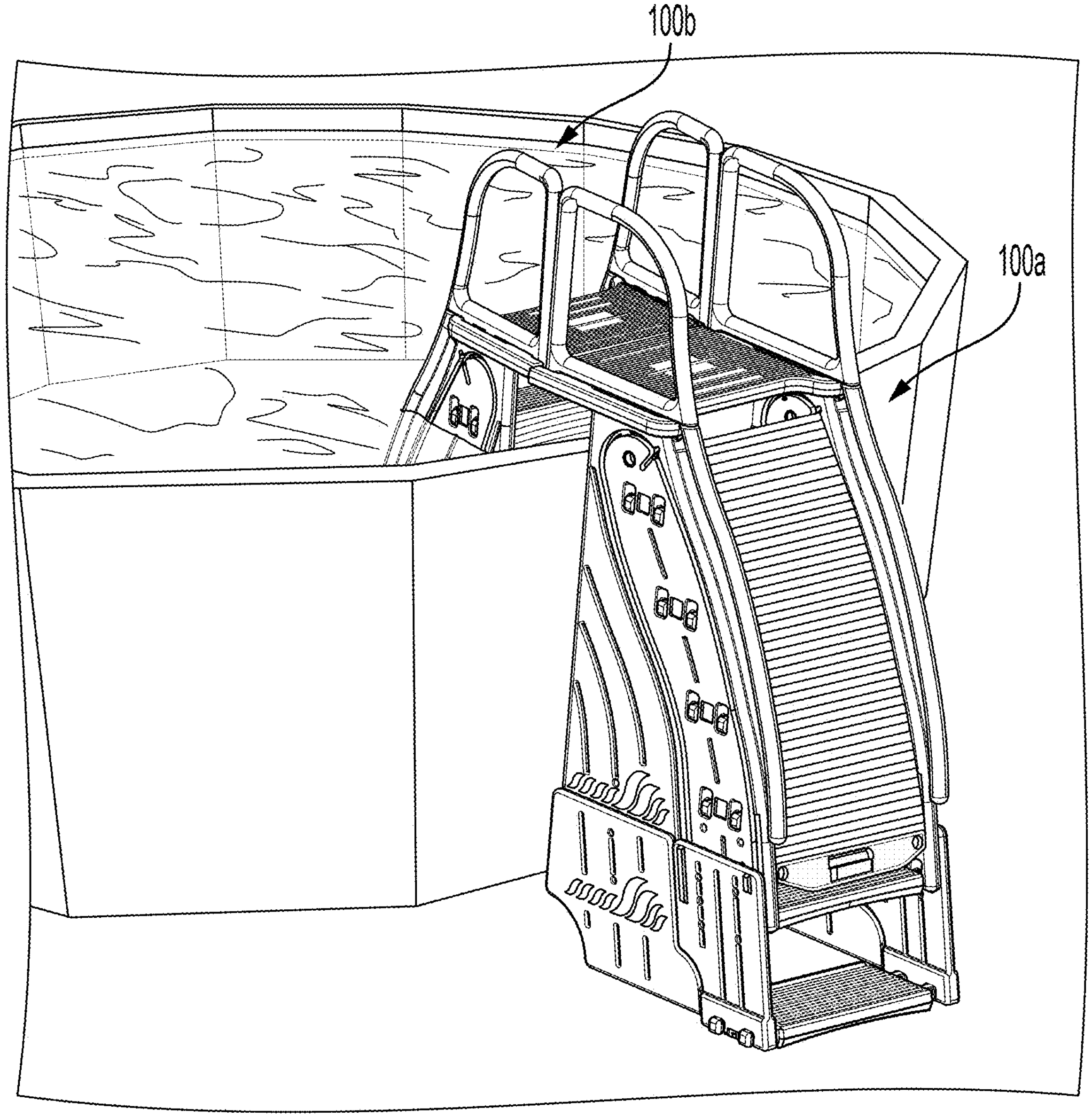
FIG. 17 illustrates modular ladders coupled together to form an A-Frame ladder according to an embodiment of the present disclosure.

FIG. 17 illustrates two modular ladders 100*a* and 100*b* coupled together to form an A-Frame ladder according to an embodiment of the present disclosure. Referring to FIG. 17, the coupling flange 1510 of the first and second handrails 140*a*, 140*b* may be used to secure two instances of ladder 100*a*, 100*b* to form an A-frame ladder. In other embodiments, the coupling flange 1510 may be used to secure the ladder 100 to another ladder of suitable style and structure. The attachment holes 1520 of the coupling flange 1510 of ladder 100*a* may be coupled with the attachment holes 1520 of the coupling flange 1510 of ladder 100*b* using ¾-inch bolts and corresponding nuts and washers of appropriate thickness, for example.

In some configurations, the ladder 100*b* may regularly occupy an interior portion of an above-ground pool. For example, a ladder 100 may be mounted to a deck or platform or may be mounted to a second ladder 100*a* to form an A-frame ladder and continually extend into the pool. In such instances, an unsafe situation may arise by allowing the flexible tambour barrier 130 to be moved into the first position, thereby preventing access to the plurality of stairs while in the water. In such instances, the flexible tambour barrier 130 may be fixed in the second position as explained above. Fixing the flexible tambour 130 from being moved along the first groove 113 into the first position, inhibits pass through entry between the plurality of steps 160, and provides continual access to the plurality of steps 160 from the pool.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. While the invention has been described by reference to various specific embodiments, it should be understood that numerous changes may be made within the spirit and scope of the inventive concepts described. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated. Accordingly, it is intended that the invention not be limited to the described embodiments, but will have full scope defined by the language of the following claims.

What is claimed is:

1. A ladder assembly, comprising:

first and second side rail structures each having an upper end and first and second, oppositely facing surfaces, wherein the first surface of the first side rail structure and the second surface of the second side rail structure face each other in an assembled condition of the ladder assembly;

at least one stair member spanning between the first and second side rail structures in the assembled condition of the ladder assembly;

a platform having an upper surface, a lower surface opposite the upper surface, and an outer perimeter defining a posterior edge, an anterior edge, and side surfaces, the platform having first and second openings passing through the upper surface to the lower surface; and first and second handrails each having a lower member with at least one anterior locking lug extending therefrom;

wherein:

in the assembled condition the upper end of the first side rail structure occupies a portion of the platform first opening, the anterior locking lug of the first handrail occupies a portion of the platform first opening and interlocks with the upper end of the first side rail structure within the platform first opening;

in the assembled condition the upper end of the second side rail structure occupies a portion of the platform second opening, the anterior locking lug of the second handrail occupies a portion of the platform second opening and interlocks with the upper end of the second side rail structure within the platform second opening; and the first and second side rail structure are interchangeable for purposes of interconnecting with the first and second handrail in the platform first and second openings, respectively, wherein the upper end of the first and second side rail structures each include one or more recesses configured to receive the anterior locking lug, and wherein the upper end of the first and second side rail structures each include a channel, wherein the anterior locking lug of the first and second handrails engages with the channel of the first and second side rail structures, respectively, and wherein the channel of the first and second side rail structures and respective anterior locking lugs are slidable relative to one another to interlock the anterior locking lugs with their respective side rail structure, wherein the one or more recesses are oriented differently than their respective channels such that sliding movement of the anterior locking lug along its respective channel in a first direction substantially prevents the anterior locking lug from exiting its respective recess, and wherein the platform first and second openings each include at least one locking tab that prevents movement of the anterior locking lug in a second direction opposite the first direction and thereby locks the anterior locking lug to the platform.

2. The ladder assembly of claim 1 wherein the anterior locking lugs of each of the first and second handrails include a recess for receiving the locking tab to interlock the anterior locking lug and the side rail structure and the platform in the assembled condition.

3. The ladder assembly of claim 1 wherein the openings are defined by planar surfaces and lying along planes which extend substantially perpendicular to the platform upper and lower surfaces.

4. The ladder assembly of claim 1 further comprising a flange in each of the first and second openings in the platform, and a second channel within each of the upper ends of the first and second side rail structures, wherein the respective flanges and the respective second channels cooperate to locate the platform relative to the upper ends of the respective first and second side rail structures.

5. The ladder assembly of claim 1 wherein the upper ends of the first and second side rail structures and the anterior locking lugs of the first and second handrails fit within and substantially fill the first and second openings, respectively.

6. A ladder for entering or exiting an above-ground swimming pool, the ladder comprising:

first and second side rail structures each having an upper end;

a platform supported by the first and second side rail structures, the platform having an upper surface, a lower surface opposite the upper surface, and an outer perimeter defining a posterior edge, an anterior edge, and side edges, the platform having first and second openings passing through the upper surface to the lower surface; and first and second handrails each having a lower member with at least one anterior locking lug extending therefrom;

wherein:

the upper end of the first and second side rail structures each include recesses oriented along a first axis and a first channel oriented along a second axis different from the first axis, the second axis being generally parallel with the upper surface of the platform;

the anterior locking lugs of the first and second handrails interlock with the upper end of the first and second side rail structures, respectively, in the openings;

the first handrail interlocks with the first side rail structure by sliding the first handrail relative to the first side rail structure along the second axis;

the second handrail interlocks with the second side rail structure by sliding the second handrail relative to the second side rail structure along the second axis; and wherein the first and second handrails form an interference fit with the first and second side rail structures, respectively, wherein the platform further comprises a channel extending along the second axis within the openings and the upper end of the first and second side rail structures includes a protrusion that corresponds with the channel and facilitates sliding.

7. The ladder of claim 6 wherein the first axis is substantially vertical, and the second axis is substantially horizontal.

8. The ladder of claim 6 wherein the first and second handrails each include two anterior locking lugs, and the upper end of the first and second side rail structures include two recesses corresponding thereto.

9. The ladder of claim 6, further comprising a ramped locking tab within the openings that engages with the anterior locking lug.

10. A ladder assembly configurable from an unassembled condition to an assembled condition, the ladder assembly comprising:

substantially identical first and second side rail structures each having an upper end and first and second, oppositely facing surfaces, wherein the first surface of the first side rail structure and the second surface of the second side rail structure face each other in the assembled condition of the ladder;

at least one stair member having first and second opposite ends configured to attach to the first surface of the first side rail structure and the second surface of the second side rail structure, respectively, in the assembled condition of the ladder assembly;

a platform having opposite upper and lower surfaces surrounded by an outer perimeter having first and second opposite side edges, the platform having a first pair of openings located adjacent the first and second side edges, respectively, the first pair of openings extending completely through the platform from the lower to the upper surface thereof;

first and second handrails each having a lower member with at least one anterior locking lug extending therefrom;

wherein during assembly of the ladder, the upper end of each of the first and second side rail structures is configured to extend into and locate within a respective one of the platform first pair of openings with the first and second side rail structures extending downwardly from the platform bottom surface; and wherein during assembly of the ladder, the anterior locking lug of each of the first and second handrails is configured to extend into and locate within a respective one of the platform first pair of openings with the first and second handrails extending upwardly from the platform upper surface; and wherein the upper end of each of the first and second side rails and a respective anterior locking lug of each of the first and second handrails are cooperatively configured to interlock with each other in a respective one of the platform first pair of openings and thereby locking the platform in place therebetween with the ladder in the assembled condition, wherein the upper end of each of the first and second side rail structures include a channel formed adjacent the first surface thereof, each of the first pair of openings in the platform including a protrusion on the inner surface thereof, the protrusions in the first pair of openings extending in the same direction toward the right side edge of the platform, each of the protrusions extending within a respective one of each of the channels and thereby cooperatively interlock with each other.

11. The ladder assembly of claim 10 wherein the upper end of each of the first and second side rail structures include a channel formed adjacent the second surface thereof, wherein each the upper end of each of the first and second side rail structures include an upper surface, wherein a recess is formed in and extends from the upper surface to the channel, wherein when the upper ends of the first and second side rail structures are located in the first and second openings of the platform, respectively, the recess and channel form an L-shaped opening within the first and second openings of the platform, respectively, whereby the anterior locking lug is configured to extend into the recess in a first direction and subsequently travel along the channel in a second direction to thereby secure the anterior locking lug to a respective side rail structure.

12. The ladder assembly of claim 10 wherein each of the first pair of openings in the platform including a ramped locking tab extending from a respective the inner surface in a direction toward a respective the protrusion, each of the anterior locking lugs having a recess on the side thereof opposite the protrusion, whereby when moving the anterior locking lug in the channel, the anterior locking lug passes over the locking tab with the locking tab locating within the recess and thereby preventing the anterior locking lug from moving in the opposite direction.

13. The ladder assembly of claim 10 wherein each of the first pair of openings in the platform including a ramped locking tab extending from a respective the inner surface in a direction toward a respective the protrusion, each of the anterior locking lugs having a recess on the side thereof opposite the protrusion, whereby when moving the anterior locking lug in the channel, the anterior locking lug pass over the locking tab with the locking tab locating within the recess and thereby preventing the anterior locking lug from moving in the opposite direction.

14. A ladder assembly configurable from an unassembled condition to an assembled condition, the ladder assembly comprising:

substantially identical first and second side rail structures each having an upper end and first and second, oppositely facing surfaces, wherein the first surface of the first side rail structure and the second surface of the second side rail structure face each other in the assembled condition of the ladder;

at least one stair member having first and second opposite ends configured to attach to the first surface of the first side rail structure and the second surface of the second side rail structure, respectively, in the assembled condition of the ladder assembly;

a platform having opposite upper and lower surfaces surrounded by an outer perimeter having first and second opposite side edges, the platform having a first pair of openings located adjacent the first and second side edges, respectively, the first pair of openings extending completely through the platform from the lower to the upper surface thereof;

first and second handrails each having a lower member with at least one anterior locking lug extending therefrom;

wherein during assembly of the ladder, the upper end of each of the first and second side rail structures is configured to extend into and locate within a respective one of the platform first pair of openings with the first and second side rail structures extending downwardly from the platform bottom surface; and wherein during assembly of the ladder, the anterior locking lug of each of the first and second handrails is configured to extend into and locate within a respective one of the platform first pair of openings with the first and second handrails extending upwardly from the platform upper surface; and wherein the upper end of each of the first and second side rails and a respective anterior locking lug of each of the first and second handrails are cooperatively configured to interlock with each other in a respective one of the platform first pair of openings and thereby locking the platform in place therebetween with the ladder in the assembled condition, wherein the upper end of each of the first and second side rail structures include a channel formed adjacent the second surface thereof, wherein each the upper end of each of the first and second side rail structures include an upper surface, wherein a recess is formed in and extends from the upper surface to the channel, wherein when the upper ends of the first and second side rail structures are located in the first and second openings of the platform, respectively, the recess and channel form an L-shaped opening within the first and second openings of the platform, respectively, whereby the anterior locking lug is configured to extend into the recess in a first direction and subsequently travel along the channel in a second direction to thereby secure the anterior locking lug to a respective side rail structure.

15. The ladder assembly of claim 14 wherein the upper end of each of the first and second side rail structures include a channel formed adjacent the first surface thereof, each of the first pair of openings in the platform including a protrusion on the inner surface thereof, the protrusions in the first pair of openings extending in the same direction toward the right side edge of the platform, each of the protrusions extending within a respective one of each of the channels and thereby cooperatively interlock with each other.

* * * * *